US009326211B2

(12) United States Patent
Kaur et al.

(10) Patent No.: US 9,326,211 B2
(45) Date of Patent: Apr. 26, 2016

(54) RECONFIGURATION AND HANDOVER PROCEDURES FOR FUZZY CELLS

(75) Inventors: Samian J. Kaur, Plymouth Meeting, PA (US); Philip J. Pietraski, Huntington Station, NY (US); Ana Lucia A. Pinheiro, Breinigsville, PA (US); Stephen E. Terry, Northport, NY (US); Carl Wang, Melville, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 155 days.

(21) Appl. No.: 13/703,343

(22) PCT Filed: Jun. 10, 2011

(86) PCT No.: PCT/US2011/040066
§ 371 (c)(1),
(2), (4) Date: Apr. 15, 2013

(87) PCT Pub. No.: WO2011/156769
PCT Pub. Date: Dec. 15, 2011

(65) Prior Publication Data
US 2013/0215772 A1    Aug. 22, 2013

Related U.S. Application Data

(60) Provisional application No. 61/353,639, filed on Jun. 10, 2010.

(51) Int. Cl.
H04W 4/00 (2009.01)
H04W 36/30 (2009.01)
H04W 36/00 (2009.01)
H04L 5/00 (2006.01)
H04W 36/18 (2009.01)
H04W 36/28 (2009.01)

(52) U.S. Cl.
CPC .......... *H04W 36/30* (2013.01); *H04W 36/0072* (2013.01); *H04L 5/0035* (2013.01); *H04W 36/18* (2013.01); *H04W 36/28* (2013.01)

(58) Field of Classification Search
None
See application file for complete search history.

(56) References Cited

U.S. PATENT DOCUMENTS 9,014,141 B2 *   4/2015   Kim .............................. 370/331
(Continued)

FOREIGN PATENT DOCUMENTS

EP          2190241 A1      5/2010

OTHER PUBLICATIONS

3rd Generation Partnership Project (3GPP), R2-101076, "Explicit Activation and Deactivation", Nokia Siemens Networks, Nokia Corporation, 3GPP TSG-RAN WG2 Meeting #69 San Francisco, U.S.A, Feb. 22-26, 2010, 6 pages.
3rd Generation Partnership Project (3GPP), R2 093722, "Handover for Carrier Aggregation", CATT, 3GPP TSG RAN WG2 Meeting #66bis Los Angeles, USA, Jun. 29-Jul. 3, 2009, 3 pages.
(Continued)

*Primary Examiner* — Michael J Moore, Jr.
(74) *Attorney, Agent, or Firm* — Condo Roccia Koptiw LLP

(57) ABSTRACT

A wireless transmit/receive unit (WTRU) may transmit data via multiple component carriers associated with multiple eNode-Bs. The WTRU may receive a handover request message from a source eNode-B. While maintaining a connection with a component carrier on the source eNode-B, the WTRU may establish a connection with another component carrier on a target eNode-B.

30 Claims, 21 Drawing Sheets

(56) References Cited

U.S. PATENT DOCUMENTS

| | | |
|---|---|---|
| 2009/0310563 A1 | 12/2009 | Chou et al. |
| 2011/0098054 A1* | 4/2011 | Gorokhov et al. ......... 455/452.1 |
| 2012/0002643 A1* | 1/2012 | Chung et al. .................. 370/331 |
| 2012/0176996 A1* | 7/2012 | Kim et al. ..................... 370/329 |
| 2013/0153298 A1* | 6/2013 | Pietraski et al. ................ 175/45 |
| 2013/0176988 A1* | 7/2013 | Wang et al. ................... 370/331 |
| 2014/0198744 A1* | 7/2014 | Wang et al. ................... 370/329 |

OTHER PUBLICATIONS

3rd Generation Partnership Project (3GPP), Tdoc R2-096066, "Email discussion on terminologies of carrier aggregation (67#35)", Samsung, 3GPP TSG-RAN2 #67bis meeting, Agenda Item 7.3.1, Miyazaki, Japan, Oct. 12-16, 2009, 9 pages.

3rd Generation Partnership Project (3GPP), Tdoc R2-111209, "Measurement of Deactivated Scells", Motorola Mobility, 3GPP TSG-RAN WG2#73, Agenda Item 7.1.2, Taipei, Taiwan, Feb. 21-25, 2011, 3 pages.

\* cited by examiner

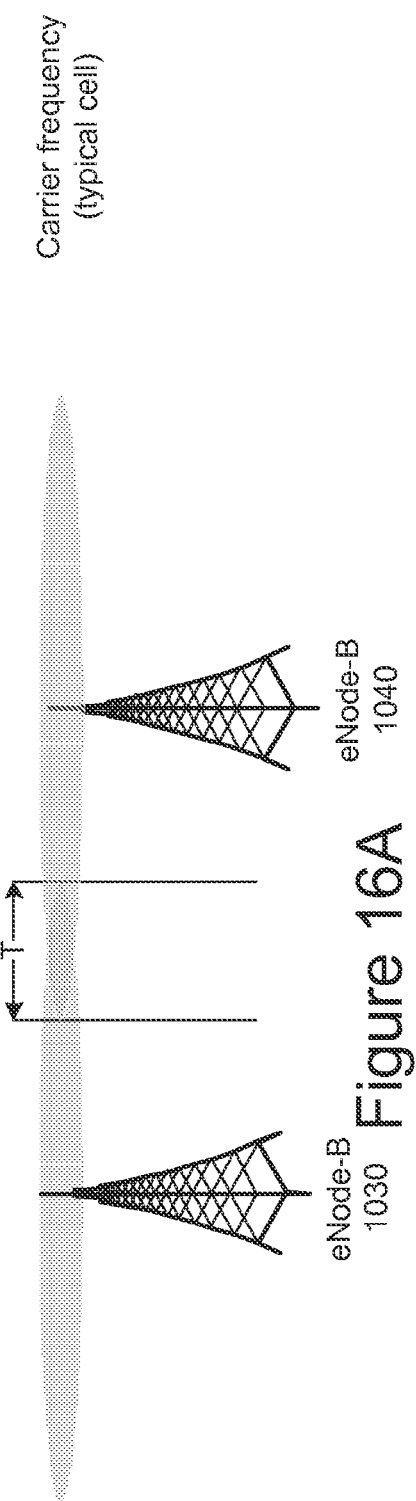
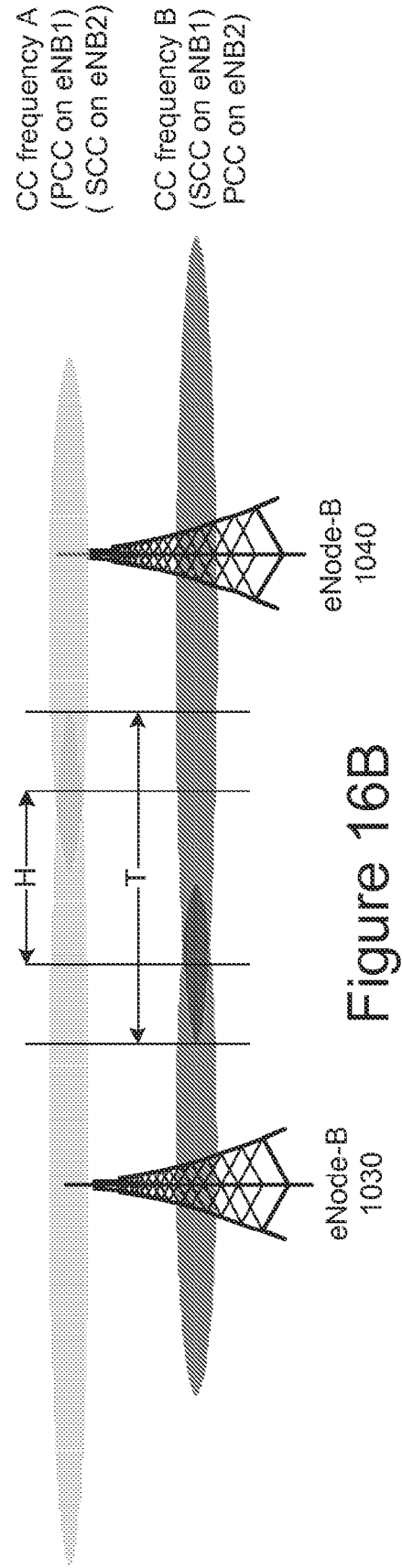
Figure 16A
Figure 16B

RECONFIGURATION AND HANDOVER PROCEDURES FOR FUZZY CELLS

This application is the 35 U.S.C. §371 National Stage of Patent Cooperation Treaty Application No. PCT/US2011/040066, filed Jun. 10, 2011, which claims the benefit of U.S. provisional application No. 61/353,639 filed on Jun. 10, 2010, the contents of which are hereby incorporated by reference herein, for all purposes.

BACKGROUND

In wireless networking, component carrier cooperation among multiple component carriers may be utilized to increase data throughput. For example, a fuzzy cell deployment may enable a user equipment (UE) to stay near cell center by handing over the UE to multiple component carriers (CCs) at different locations. Conventional support of component carrier cooperation takes place at a single serving eNode-B.

SUMMARY

With the introduction of fuzzy cells, simultaneously maintaining data connections from multiple CCs on multiple eNode-Bs may be needed. Moreover, it may be desirable to fully realize the benefits of the data throughput increased by fuzzy cell deployment.

As disclosed herein, component carrier cooperation (CCC) may be implemented among different component carriers across multiple sites to increase the cell-edge user data throughput. The component carrier cooperation may include carrier specific reconfiguration and handover procedures for fuzzy cells.

Specifically, a UE may transmit data via multiple component carriers associated with multiple eNode-Bs. The UE may receive a component carrier cooperation handover command from a source eNode-B. While maintaining a connection with a component carrier on the source eNode-B, the UE may establish a connection with another component carrier on a target eNode-B based on the component carrier cooperation handover command.

BRIEF DESCRIPTION OF THE DRAWINGS

FIGS. 16A-B illustrate down link fuzzy cell coverage.

DETAILED DESCRIPTION

Figure 1A:
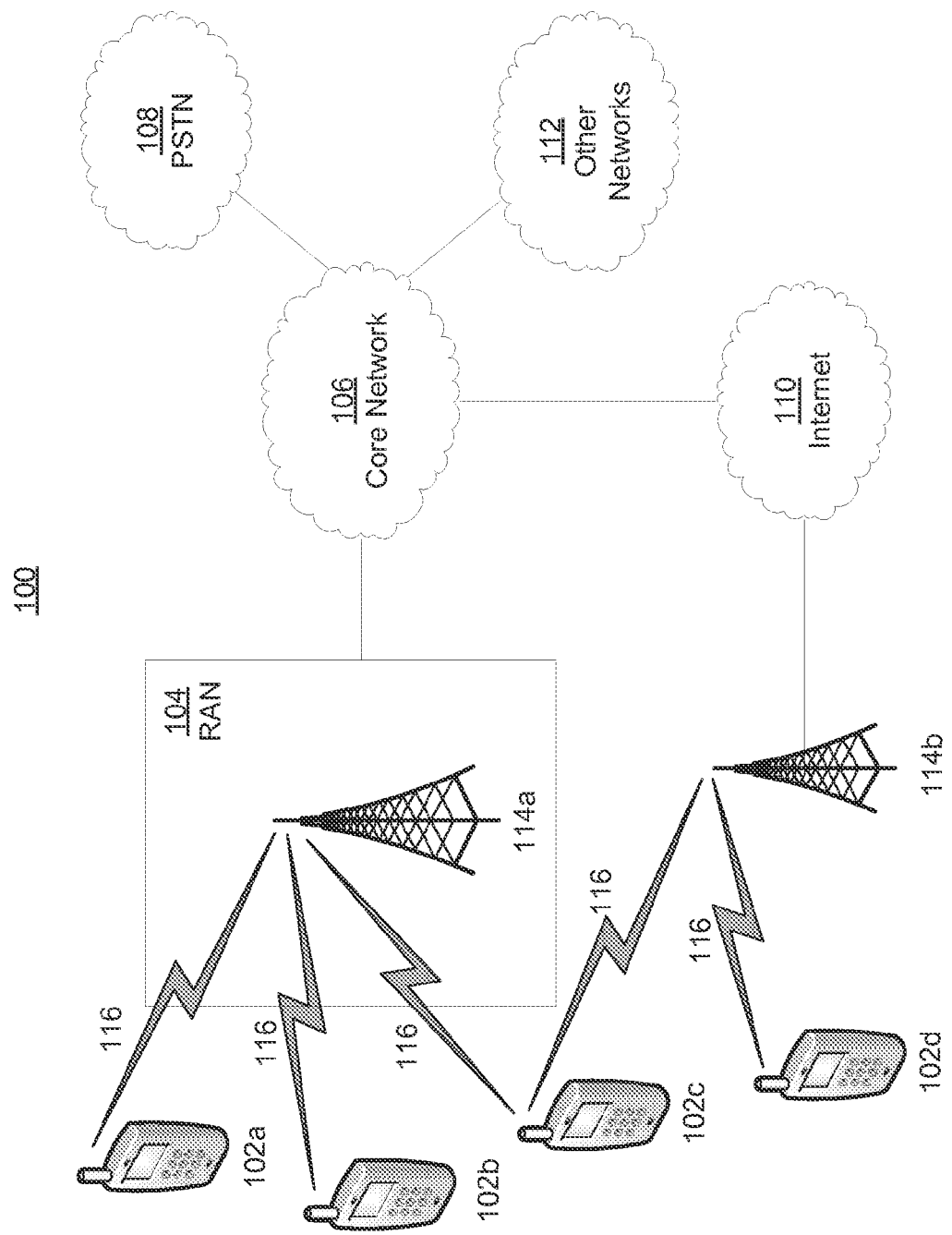
FIG. 1A is a system diagram of an example communications system in which one or more disclosed embodiments may be implemented.

As disclosed herein, component carrier cooperation (CCC) may be implemented among different component carriers across multiple sites to increase the cell-edge user data throughput. The component carrier cooperation may include carrier specific reconfiguration and handover procedures for fuzzy cells.

Specifically, a UE may transmit data via multiple component carriers associated with multiple eNode-Bs. The UE may receive a component carrier cooperation handover command from a source eNode-B. While maintaining a connection with a component carrier on the source eNode-B, the UE may establish a connection with another component carrier on a target eNode-B based on the component carrier cooperation handover command.

In one example embodiment, a source eNode-B may enable and/or perform handover of a wireless transmit/receive unit (WTRU) having data transmitted via a plurality of component carriers. The eNode-B may receive a measurement report that may be received from the WTRU. The measurement report may comprise a first signal quality of a first component carrier and a second signal quality of a second component carrier. The measurement report may comprise a channel quality indication (CQI) for each secondary serving cell (Scell) associated with a cell identification and associated with either the eNode-B or the target eNode-B. The measurement report may identify a differential seen in a channel estimation between one or more Scells associated with a cell identification. The measurement report may comprise carrier specific time to trigger (TTT) values.

The source eNode-B may transmit a component carrier cooperation (CCC) handover command to a target eNode-B. A second component carrier associated with the target eNode-B may be identified. The second component carrier may be identified by analyzing a measurement report received from the WTRU. The CCC handover command may instruct the target eNode-B to establish the second connection to the WTRU using the second component carrier.

The source eNode-B may receive a recommendation message from the target eNode-B that may identify the second component carrier.

The source eNode-B may transmit a reconfiguration message that may be transmitted to the WTRU. The reconfiguration message may instruct the WTRU to use the second component carrier associated with the target eNode-B via medium access control (MAC) or radio resource control (RRC) signaling.

A second connection to the WTRU may be established with the second component carrier associated with the target eNode-B based on the CCC handover command while a first connection to the WTRU with a first component carrier associated with the source eNode-B may be maintained.

In another example embodiment, a WTRU may enable and/or perform handover of the WTRU. A measurement report may be generated. The measurement report may indicate that a handover event occurred. Additionally, the measurement report may comprise a first signal quality of a first component carrier and a second signal quality of a second component carrier. The measurement report may comprise a channel quality indication (CQI) for each secondary serving cell (Scell) associated with a cell identification and associated with either the eNode-B or the target eNode-B. The measurement report may identify a differential seen in a channel estimation between one or more Scells associated with a cell identification. The measurement report may comprise carrier specific time to trigger (TTT) values. The measurement report may enable a CCC handover command to be transmitted to a target eNode-B, the CCC handover command instructing the target eNode-B to establish the second connection to the WTRU using the second component carrier.

The WTRU may transmit the measurement report to the source eNode-B.

The WTRU may receive a handover request message from the source eNode-B. The handover request message may instruct the WTRU to use the second component carrier via medium access control (MAC) or radio resource control (RRC) signaling.

In another example embodiment, a target eNode-B may enable and/or perform handover of a wireless transmit/receive unit (WTRU) having data transmitted via a plurality of component carriers. The target eNode-B may receive a component carrier cooperation (CCC) handover command from a source eNode-B, the CCC handover command identifying a second component carrier. The CCC handover command may instruct the target eNode-B to establish the second connection to the WTRU using the second component carrier.

The target eNode-B may transmit an acknowledgement message to the source eNode-B, the acknowledgement message indicating that the second component carrier is available. The acknowledgement may enable the source eNode-B to instruct the WTRU to use the second component carrier.

The target eNode-B may establish, while maintaining a first connection with a first component carrier associated with the source eNode-B, a second connection with a second component carrier associated with a target eNode-B based on the component carrier cooperation handover command. Establishing the second connection with the second component carrier may comprise enabling the WTRU to use the second component carrier via medium access control (MAC) or radio resource control (RRC) signaling.

The target eNode-B may transmit a recommendation message identifying a third component carrier associated with the target eNode-B.

In another example embodiment, a WTRU may enable and/or perform handover of the WTRU. The WTRU may receive an initial configuration message. The initial configuration message may enable the WTRU to use a first component carrier and a second component carrier.

The WTRU may generate a measurement report. The measurement report may indicate that a handover event occurred. Additionally, the measurement report may comprise a first signal quality of a first component carrier and a second signal quality of a second component carrier. The measurement report may comprise a channel quality indication (CQI) for each secondary serving cell (Scell) associated with a cell identification and associated with either the eNode-B or the target eNode-B. The measurement report may identify a differential seen in a channel estimation between one or more Scells associated with a cell identification. The measurement report may comprise carrier specific time to trigger (TTT) values. The measurement report may enable a CCC handover command to be transmitted to a target eNode-B, the CCC handover command instructing the target eNode-B to establish the second connection to the WTRU using the second component carrier.

The WTRU may transmit the measurement report to a source eNode-B. The WTRU may receive a handover request message from the source eNode-B. The handover request message may instruct the WTRU to perform MAC fast activation and MAC fast deactivation. The WTRU may perform MAC fast deactivation to disconnect a first connection to the source eNode-B with a first component carrier associated with the source eNode-B. The WTRU may perform MAC fast activation to establish a second connection to the target eNode-B with a second component carrier associated with the target eNode-B. The WTRU may receive an initial configuration message, the initial configuration message enabling the WTRU to use the first component carrier and the second component carrier.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1X, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
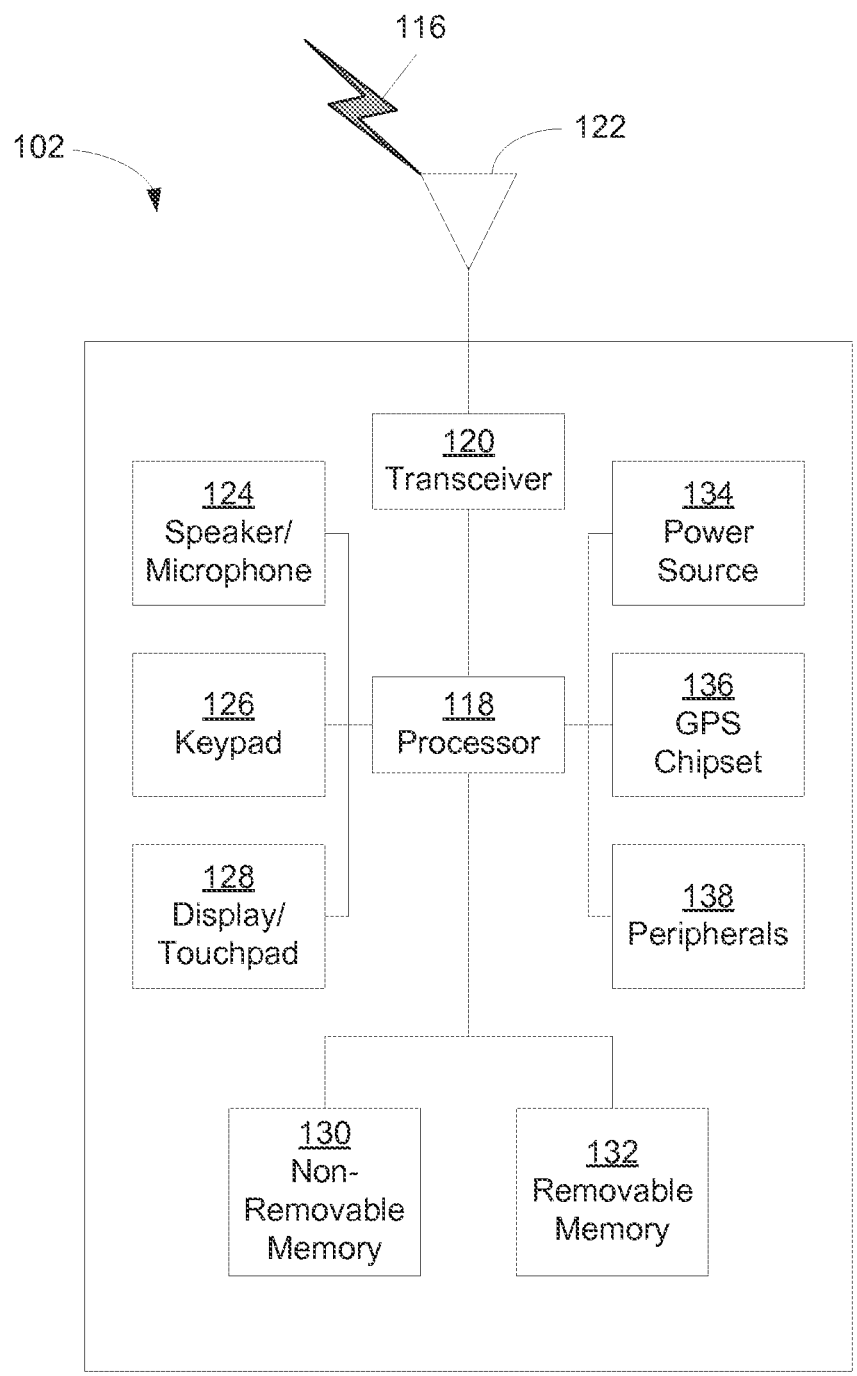
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
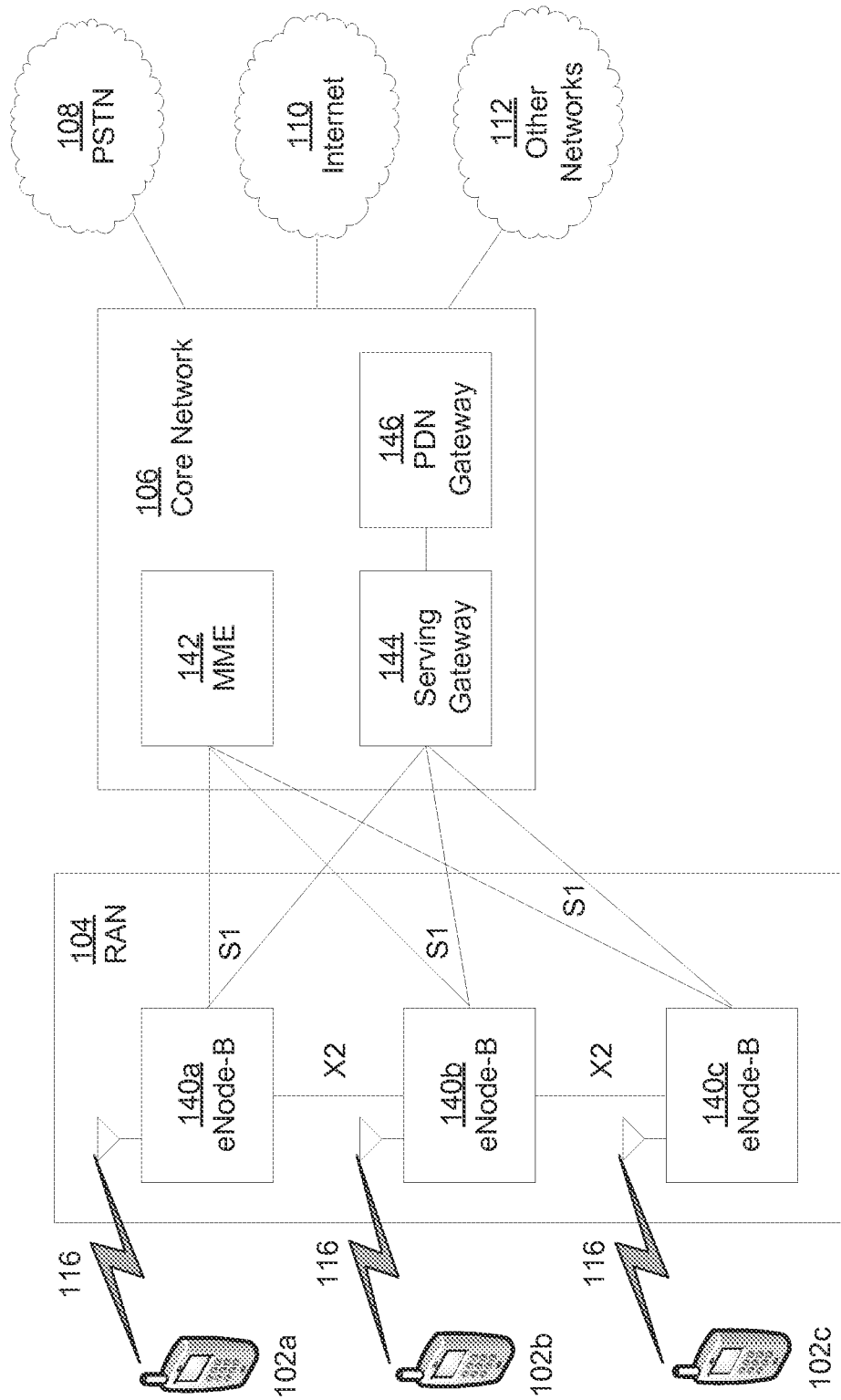
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, 140c may be associated with a particular cell (not shown) and may be configured to handle radio resource management decisions, handover decisions, scheduling of users in the uplink and/or downlink, and the like. As shown in FIG. 1C, the eNode-Bs 140a, 140b, 140c may communicate with one another over an X2 interface.

The core network 106 shown in FIG. 1C may include a mobility management gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 140a, 140b, 140c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode Bs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

Figure 2:
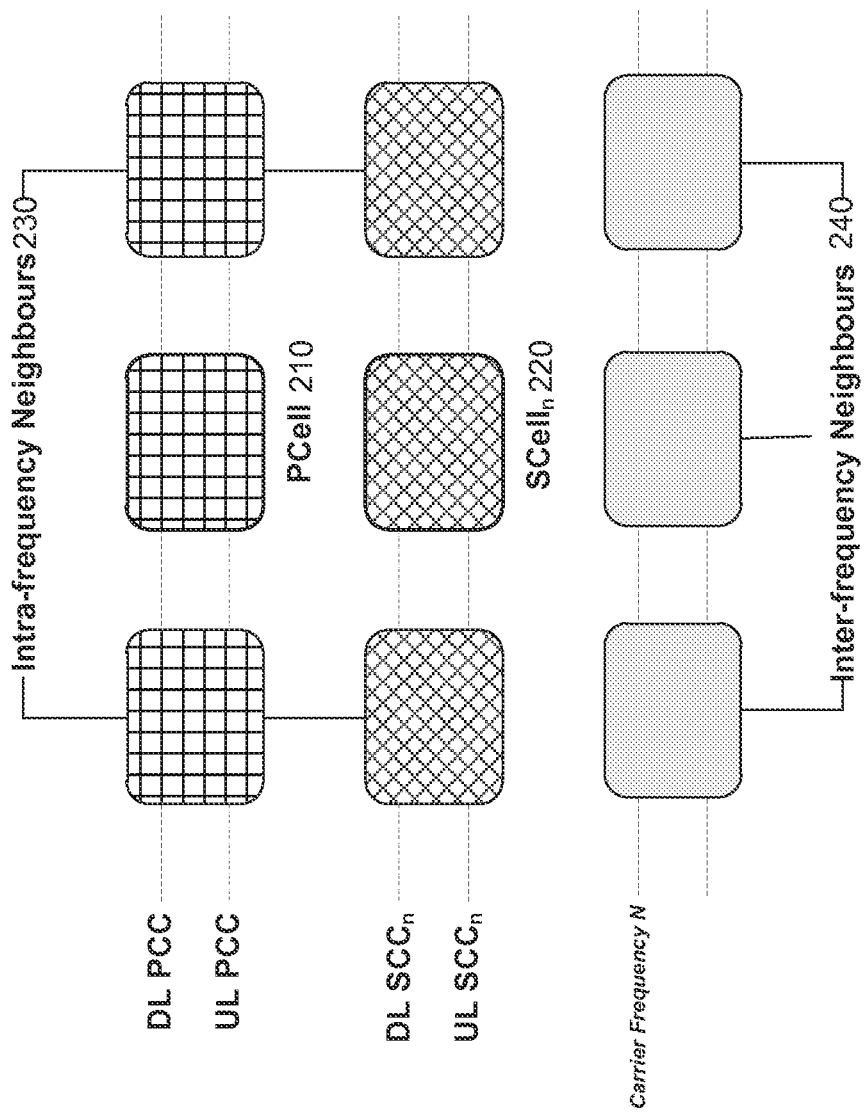
FIG. 2 depicts example primary and secondary cells.

FIG. 2 depicts example primary cells, such as primary serving cells, and secondary cells, such as secondary serving cells.

As disclosed herein, component carrier cooperation (CCC) may be implemented among different component carriers across multiple sites to increase the cell-edge user data throughput. The component carrier cooperation may include carrier specific reconfiguration and handover procedures for fuzzy cells. For example, a UE may transmit data via multiple component carriers associated with multiple eNode-Bs. The UE may receive a component carrier cooperation handover command from a source eNode-B. While maintaining a connection with a component carrier on the source eNode-B, the UE may establish a connection with another component carrier on a target eNode-B based on the component carrier cooperation handover command.

As illustrated in FIG. 2, handover in LTE advanced carrier aggregation may include changing a Primary Serving Cell (PCell), such as PCell 210. If the target cell belongs to the same carrier frequency as the source, then the handover may be an intra-frequency handover as the target cell and the source may be intra-frequency neighbors, such as intra-frequency neighbors 230. If the target cell belongs to another carrier frequency than the source, then the handover may be an inter-frequency handover as the target cell and the source may be inter-frequency neighbors, such as inter-frequency neighbors 240. Activation and deactivation may refer to Secondary Serving Cells (SCells), such as SCell 220, as a carrier can still be active from a mobility measurement viewpoint while being deactivated from a Dedicated Physical Control Channel (PDCCH) viewpoint.

At Radio Resource Control (RRC) connection establishment and/or re-establishment, one serving cell may provide security input, such as ECGI, PCI and/or ARFCN, and the NAS mobility information (e.g. TAI). The serving cell may be referred to as the PCell, such as PCell 210. For example, in the downlink, the carrier corresponding to the PCell 210 may be the Downlink Primary Component Carrier (DL PCC). In the uplink, the carrier corresponding to the PCell 210 may be the Uplink Primary Component Carrier (UL PCC).

Depending on the capabilities of an UE, SCells, such as Scell 220, may be configured to form, together with the PCell, such as PCell 210, a set of serving cells. For example, in the downlink, the carrier corresponding to SCell 220 may be a Downlink Secondary Component Carrier (DL SCC). In the uplink, the carrier corresponding to SCell 220 may be an Uplink Secondary Component Carrier (UL SCC). The configured set of serving cells for the UE may include one PCell and zero, one, or more SCells. The PCell, such as PCell 210, may be changed with handover procedure, for example, with security key change and/or Random Access Channel RACH procedure.

Figure 3:
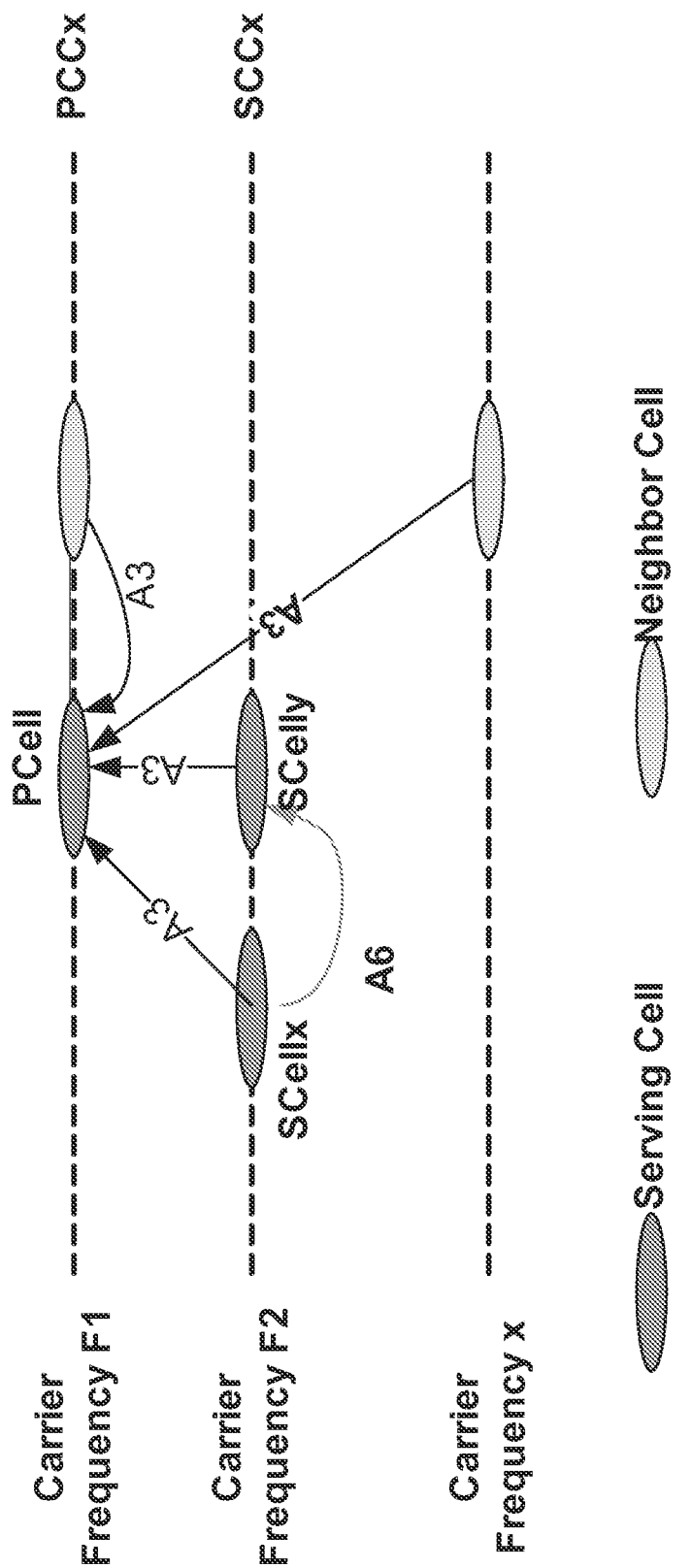
FIG. 3 illustrates example measurement events that may be used to support secondary cell handovers.

FIG. 3 illustrates example measurement events that may be used to support secondary cell handovers. For example, to support secondary cell handovers, measurement event A6 may be introduced. Measurement event A6 may be an event in which an intra-frequency neighbor may become offset better than a SCell for which neighbor cells on an SCC are compared to the SCell of that SCC.

Figure 4:
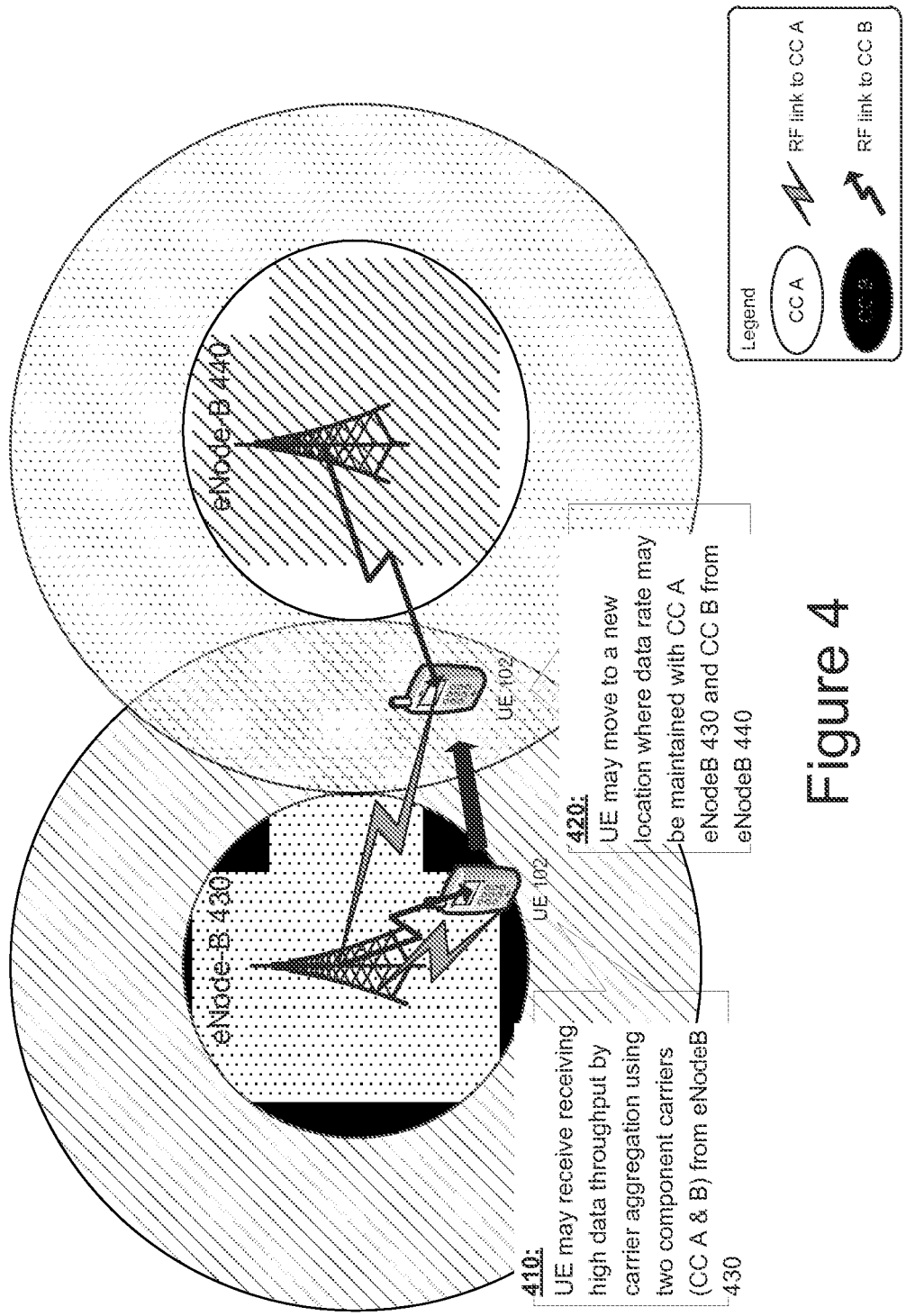
FIG. 4 illustrates fuzzy cell concept with non-uniform Tx power and cooperative Tx from multiple site.

FIG. 4 illustrates fuzzy cell concept with non-uniform transmit Tx power and cooperative Tx from multiple site.

In current and evolving cellular systems, it is generally difficult to offer uniform user experience, e.g., throughput and QoS, as user experience at cell-edge may be limited by interference from other cells. Component carriers may be used to mitigate the cell edge problem where the UE is in the good coverage of a certain component carrier at a given time. Overlaying Component Carriers (CCs) with different cell edge by coordinating adjacent eNode-Bs (cell sites) may vary transmit power of each CC in a way that changes the distance to the cell edge. Overlaying CCs may enable the UE to stay near cell center by handing over to different CCs at different location while the network may maintain a desirable frequency reuse factor, for example, a frequency reuse factor of 1.

As shown in FIG. 4, in a fuzzy cell, the UE may receive data from multiple CCs originating from multiple sites. For example, at 410, the UE 102 may receive high data throughput by carrier aggregation using two CCs, e.g. CC A and CC B from a first site such as eNode-B 430. When UE 102 moves to 420, data rate may be maintained with CC A from eNode-B 430, while CC B may be with a second site such as eNode-B 440. eNode-B 430 and/or eNode-B 430 may be eNode-B 140 shown with respect to FIG. 1C. Referring again to FIG. 4, in one embodiment, the first and/or the second site may be an eNode-B, a remote radio head RRH, or the like.

In one embodiment, data flow splitting may be determined To support a single UE's data across multiple sites, how to split and route the corresponding data amongst multiple sites may be determined. The determination may be based on the quality of service (QoS) requirements of the UE and/or the average load being experienced at each CC. Each data flow may be assigned with resources such as transmission capacity and latency and/or retransmission buffering that may support the requested QoS. The average expected load at each CC may be derived by network planner, but the instantaneous resources available for a UE on a CC may depend on the channel conditions and may be dynamically allocated by the eNode-B scheduler. Determining how much data may be sent to each CC may depend on resource availability at each cooperating site.

Figure 5:
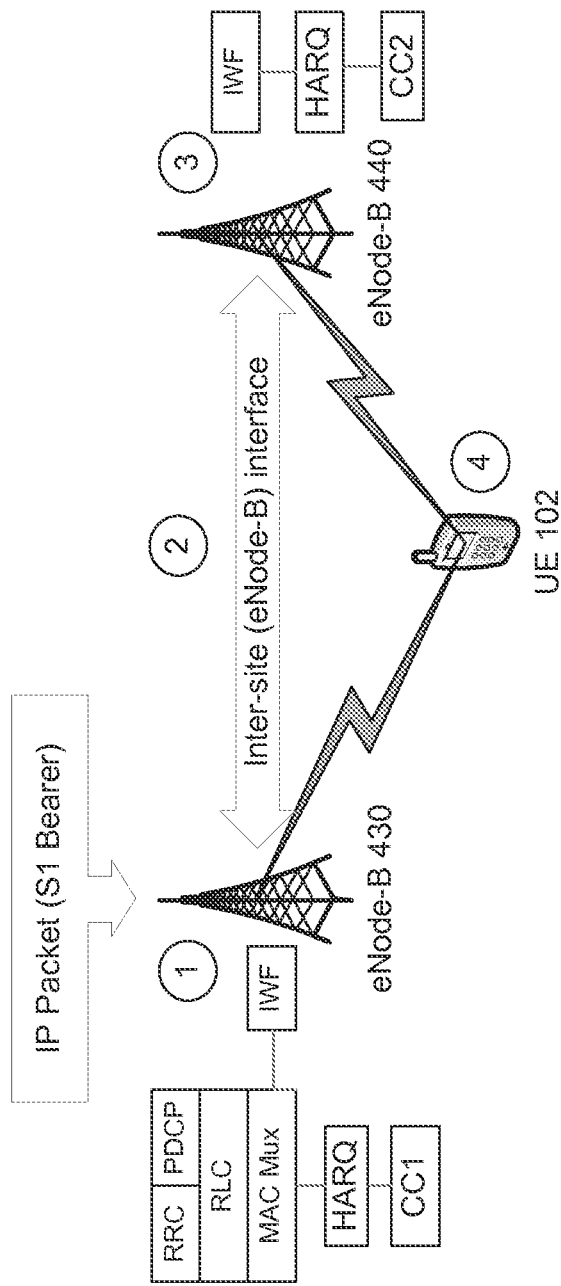
FIG. 5 illustrates an example access stratus for data splitting for fuzzy cells.

FIG. 5 illustrates an example access stratus for data splitting of fuzzy cells. In an example embodiment, data flow splitting may be implemented at the access stratum in the serving or master eNode-B, such as eNode-B 430. As shown in FIG. 5, the data may be split at the MAC layer in the transmission entity (eNode-B) access stratum stack, based on a scheduling decision. The base station may make scheduling decisions based on dynamic input from the UE as well as one or more candidate eNode-Bs. The Hybrid ARQ functionality may be left unchanged. For example, the HARQ acknowledgements may be routed to the corresponding eNode-B on the Physical Uplink Control Channel PUCCH channels. In this embodiment, data may be sent to the master eNode-B, such as eNode-B 430, and then a portion of that data may be re-routed to the other eNode-B(s), such as eNodeB 440.

Figure 6:
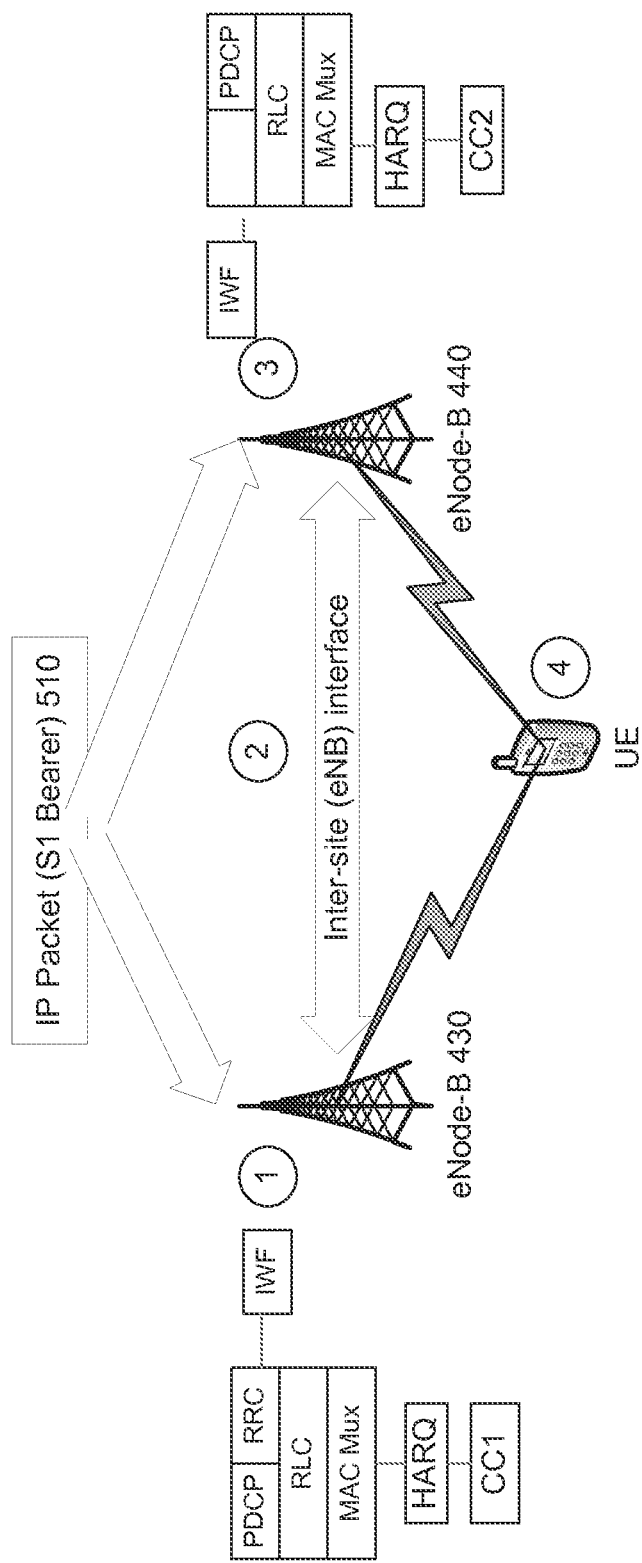
FIG. 6 depicts another example access stratum for data splitting for fuzzy cells.

FIG. 6 depicts another example access stratum for data splitting for fuzzy cells. In another embodiment, data flow splitting may be implemented at the Core Network, for example, at the serving gateway (S-GW) to send separate flows of data to the participating eNode-Bs, such as eNode-B 430 and/or 440. The configuration and UE-Context control entity in core network (EMM and S-GW) and RAN (RRC) may be extended to exchange configuration over modified S1 interface, such as IP Packet 510, to configure and support S-GW data-split subflows to different eNode-Bs, such as eNode-B 430 and/or 440. This embodiment may reduce the load in the backhaul, and may reduce duplication of traffic flows due to data flow splitting at the source eNode-B.

Figure 7:
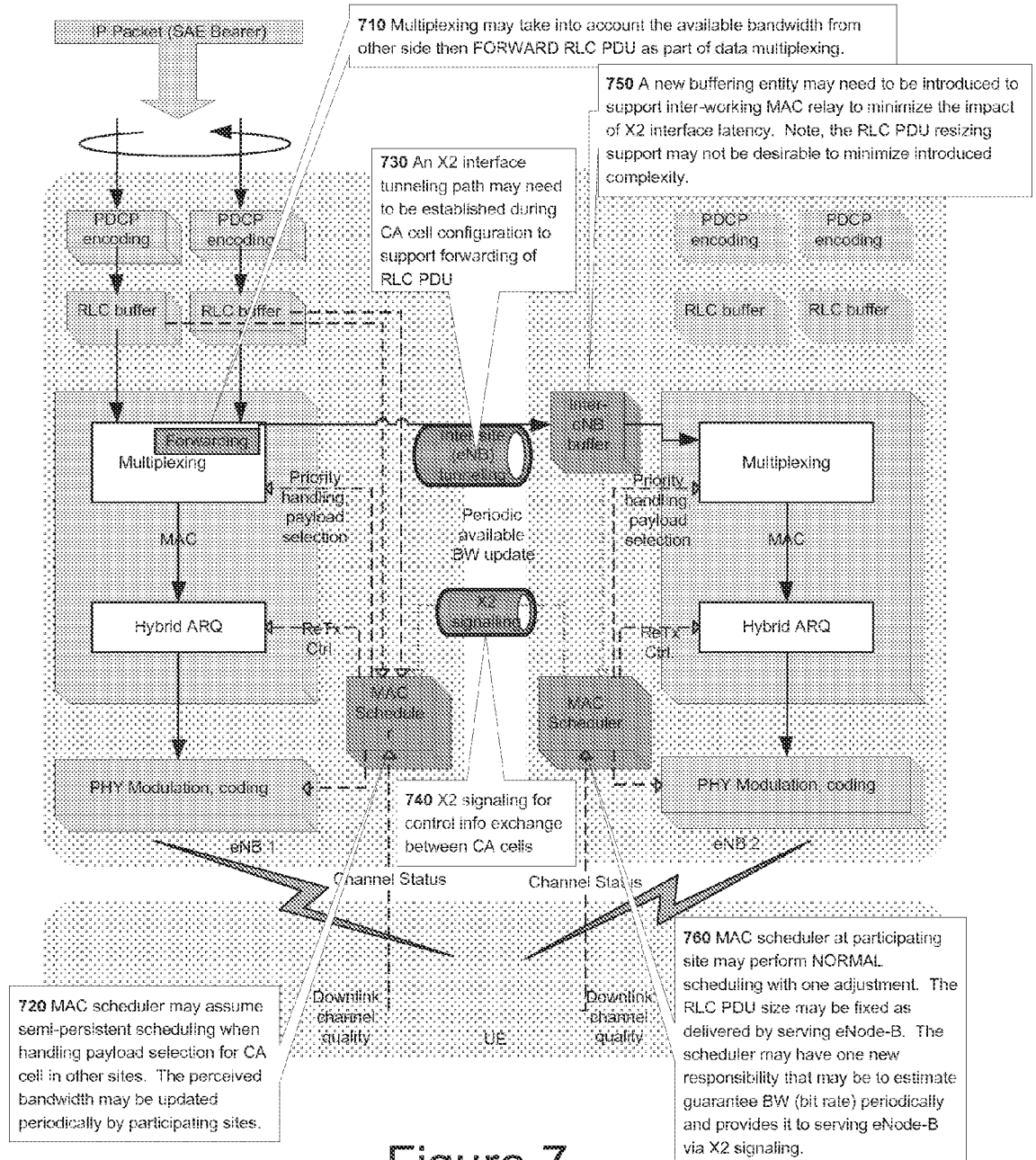
FIG. 7 illustrates example data flow split procedures at an eNode-B.

FIG. 7 illustrates example data flow split procedures at an eNode-B. At 710, multiplexing may take into account the available bandwidth from other side then FORWARD RLC PDU as part of data multiplexing. At 720, the MAC scheduler may assume semi-persistent scheduling when handling payload selection for CA cell in other sites. The perceived bandwidth may be updated periodically by participating sites. At 730, an X2 interface tunneling path may need to be established during CA cell configuration to support forwarding of RLC PDU. At 740, X2 signaling for control info exchange between CA cells. At 750, a new buffering entity may need to be introduced to support inter-working MAC relay to minimize the impact of X2 interface latency. Note that the RLC PDU resizing support may not be desirable to minimize introduced complexity. At 760, the MAC scheduler at participating site may perform NORMAL scheduling with one adjustment. The RLC PDU size may be fixed as delivered by serving eNode-B. The scheduler may have one new responsibility that may be to estimate guarantee BW (bit rate) periodically and provides it to serving eNode-B via X2 signaling.

Figure 8:
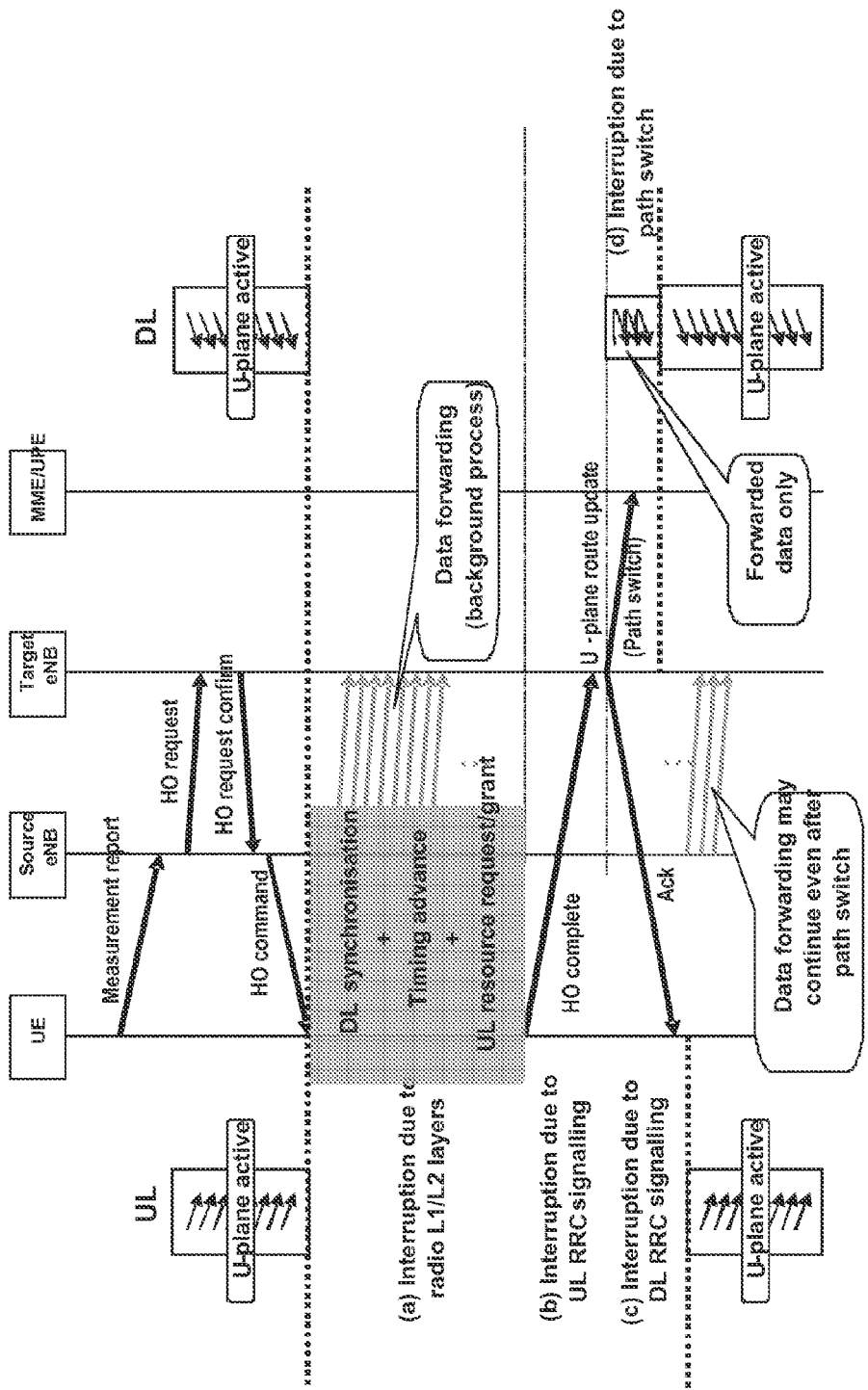
FIG. 8 illustrates example hard handover procedures.

FIG. 8 illustrates example hard handover procedures. As shown in FIG. 8, when a UE in CONNECTED mode moves between two cells, "backward" handover or predictive handover may be carried out. In this type of handover, the source cell, based on measurement reports from the UE, may determine the target cell and may query the target cell if the target cell has enough resources to accommodate the UE. The target cell may also prepare radio resources before the source cell may command the UE to handover to the target cell.

In one example embodiment, each eNode-B in a synchronized deployment of eNode-Bs may be capable of supporting UEs on multiple CCs. The UE may be capable of receiving a set of CCs where each CC may correspond to a site. For example, each CC may be transmitted from a different site. In current frameworks, support for carrier aggregation is typically limited to one serving eNode-B. A UE would have one RRC connection with the network, with one special cell that provides security and NAS information.

As shown in FIG. 4, at 410, the UE may be associated with an RRC connection with eNode-B 430, and established component carrier set of CC A and CC B. Hence, the UE may be associated with a serving cell or special cell at eNode-B 430, and may get the security and NAS mobility information from eNode-B 430 until a serving cell handover takes place. However, a UE may have difficulty maintaining a data connection simultaneously from a CC on different eNode-B, such as eNode-B 440, than eNode-B 430. As shown in FIG. 4, when the UE moves into a location where there is a coverage overlap from CCs on two different eNode-Bs, such as at 420, the network radio resource management (RRM) entity may need to determine whether to handover to another site.

Figure 9:
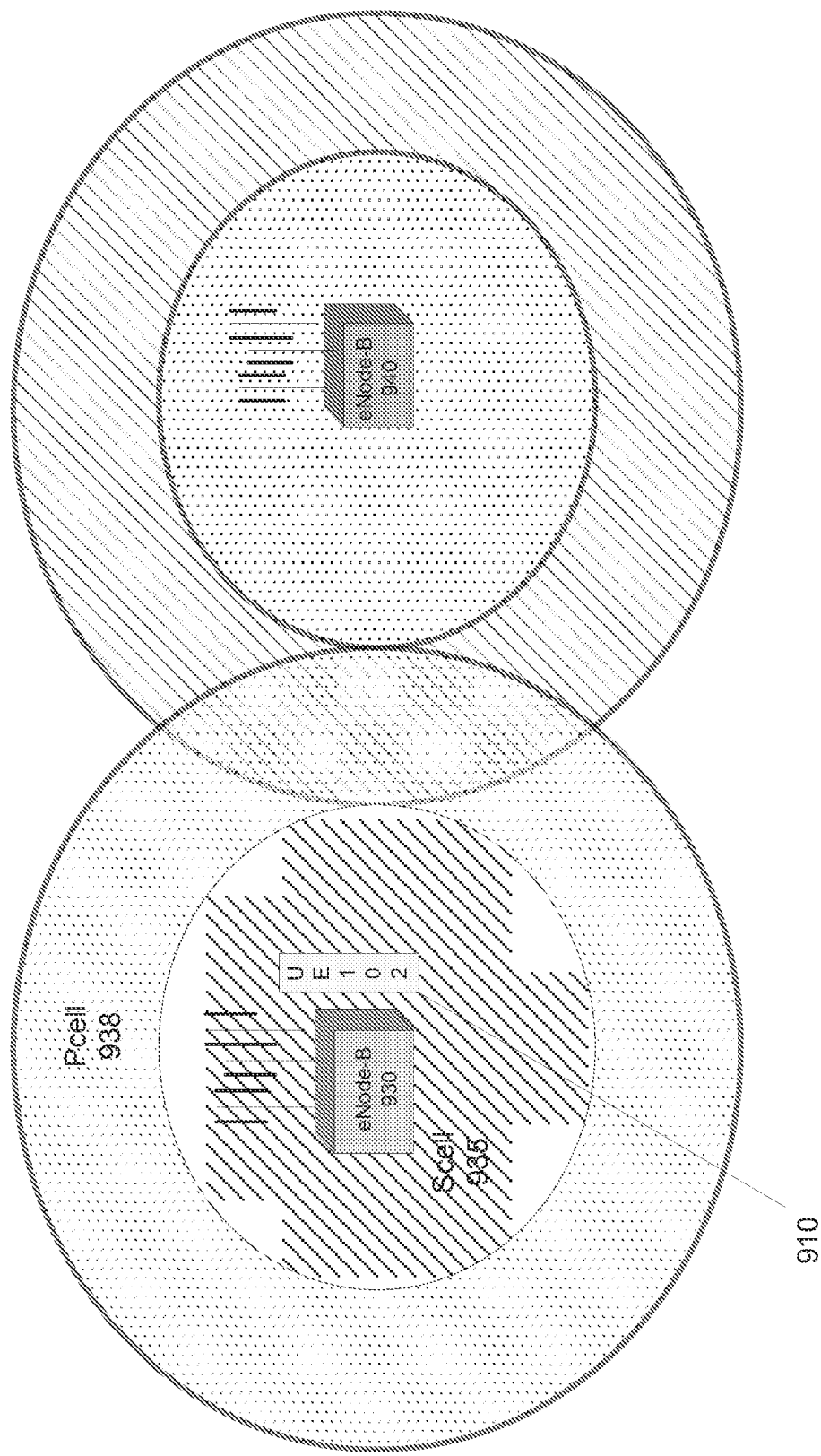
FIG. 9 illustrates an example fuzzy cell deployment.

FIG. 9 illustrates an example fuzzy cell deployment. To implement carrier specific handover in a fuzzy cell deployment, a UE context with the target eNode-B may be established before actual handover procedure. This may allow the UE to begin to receive user-plane traffic from the target eNode-B, while continuing to receive traffic from the source eNode-B. As shown in FIG. 9, eNode-B 930 and eNode-B 940 may be deployed with CCs on two frequencies, which are represented by the slashed area and the dotted area. For example, eNode-B 930 may deploy with CC A and eNode-B 940 may deploy with CC B. eNode-B 930 and/or 940 may be eNode-B 140 shown with respect to FIG. 1C.

Referring again to FIG. 9, eNode-B 930 may be the master eNode-B, and eNode-B 940 may be the cooperating eNode-B. In FIG. 9, PCell 935 may be the primary serving cell associated with the master eNode-B, and Scell 938 may be the secondary serving cell associated with the master eNode-B. UE 102 may be connected to a source eNode-B, such as eNode-B 930, and may be handed over to a target eNode-B, such as eNode-B 940. At 910, UE 102 may be connected to eNode-B 930 via a PCell such as a cell Pcell 935 and a SCell such as 938.

In one example embodiment, RRC based handover procedure may be extended to enable carrier level fuzzy handovers. In another example embodiment, Scell fast activation/deactivation procedures may be extended to enable fuzzy handovers.

Figure 10:
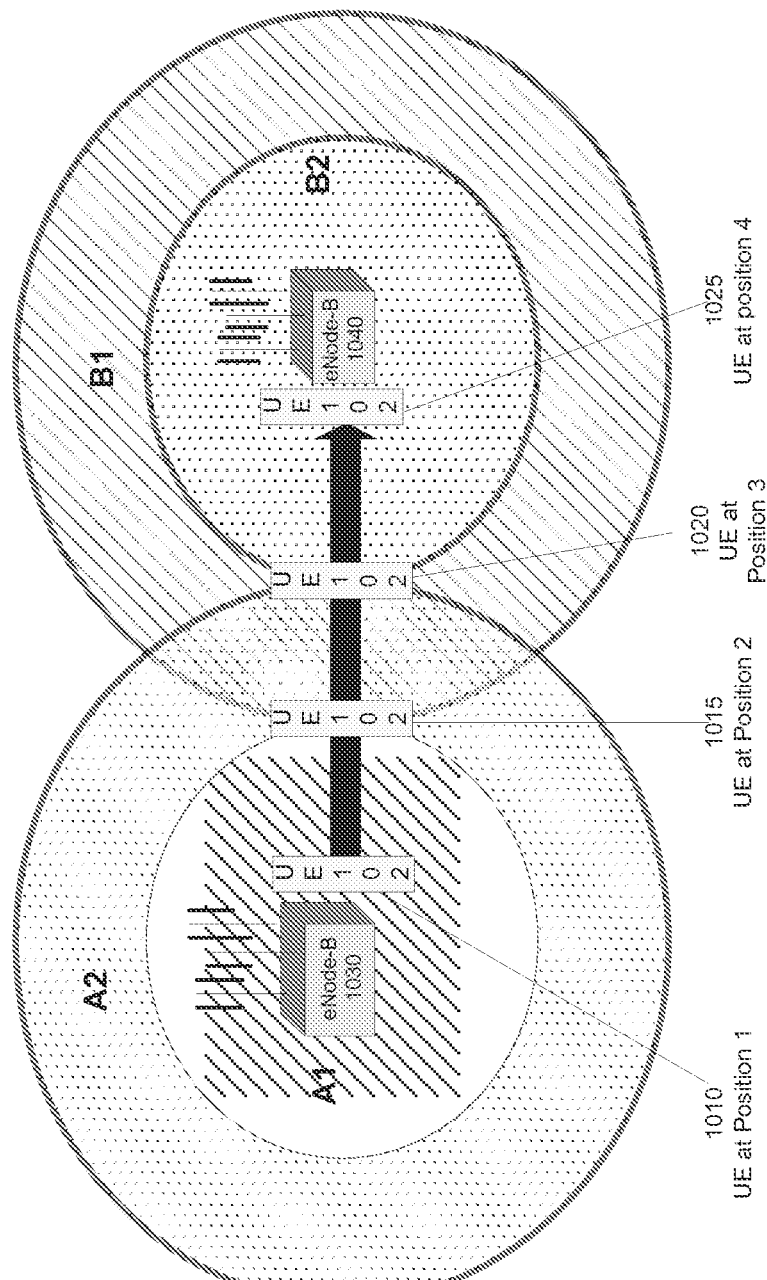
FIG. 10 illustrates an example two base-station fuzzy cell deployment.

FIG. 10 illustrates an example of two base-station fuzzy cell deployment. As shown in FIG. 10, eNode-B 1030 and eNode-B 1040 may be deployed with CCs on different frequencies; the slashed area and the dotted area represent the different frequencies. UE 102 may be connected to a source eNode-B, such as eNode-B 1030, and may be handed over to a target eNode-B, such as eNode-B 1040. This embodiment may be used to trigger data-splitting operations when a UE moves in a straight line from eNode-B 1030 to eNode-B 1040. eNode-B 1030 and/or eNode-B 1040 may be eNode-B 104 shown with respect to FIG. 1C.

As shown in FIG. 10, at 1010 UE 102 may be connected to eNode-B 1030 via a PCell such as cell A2 and a SCell such as cell A1. In one example, the UE may have two QoS services configured including a QoS for VoIP calls and a QoS for data calls. As shown, eNode-B 1030 may route the data traffic on A1 and A2.

Figure 11:
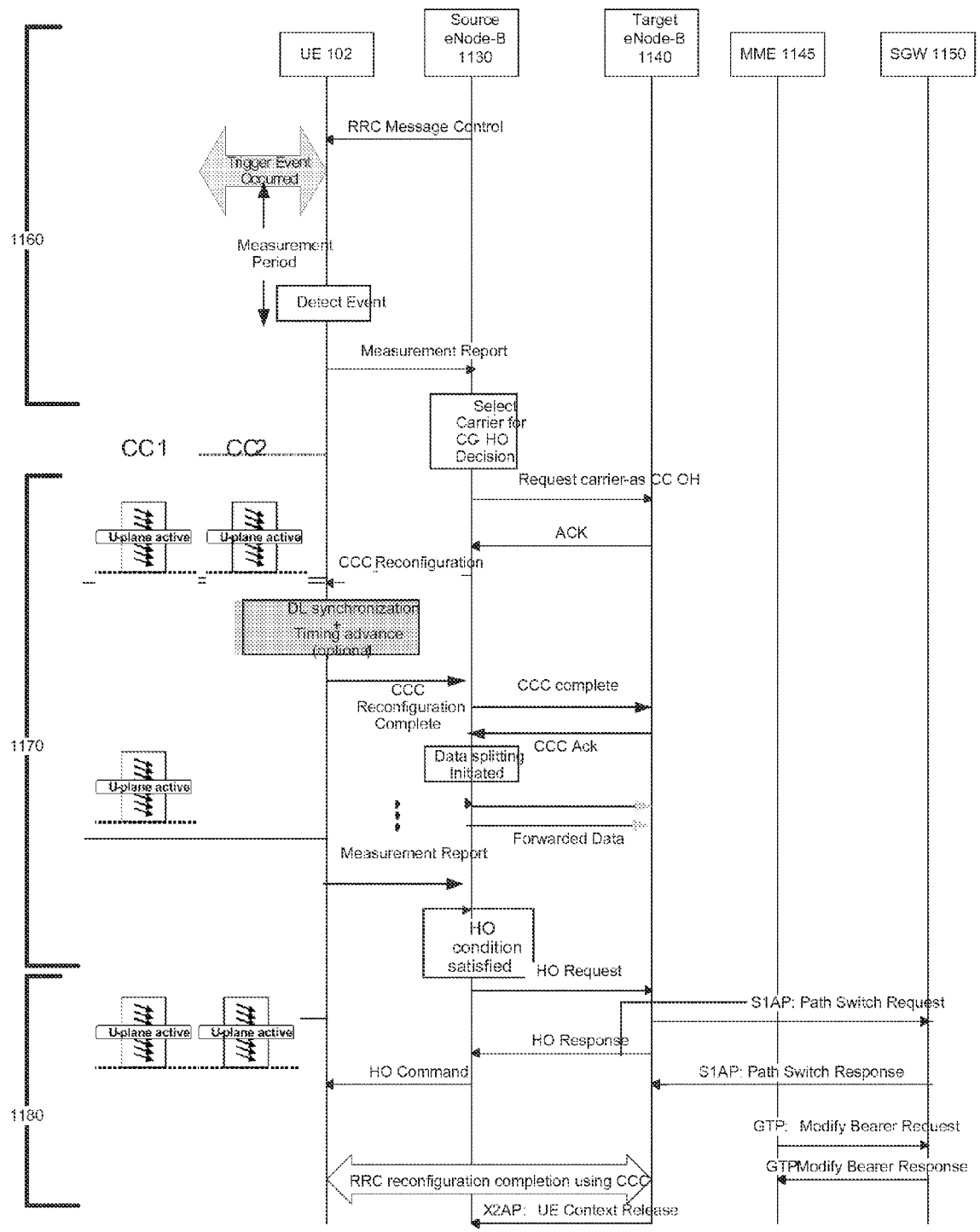
FIG. 11 depicts example reconfiguration procedures for fuzzy cells.

When UE 102 moves from 1010 to 1015, eNode-B 1030 may continue to route traffic through A2. Based on the channel conditions, as UE 102 moves towards the cell-edge of A1, the scheduling decision at eNode-B 1030 may redirect most UE traffic through A2, and may prioritize VoIP traffic to prevent voice quality from degrading at the cell edge. The measurement report may include signal quality of each component carrier of neighbor eNode-Bs. UE 102 may measure the pilot signal strength of each component carrier of neighboring eNode-Bs using the different FFT modules. For example, UE 102 may measure the pilot signal strength of each component carrier of eNode-B 1040. FIG. 11, which will be further described, below depicts example reconfiguration procedures for fuzzy cells.

As shown in FIG. 10, as UE 102 continues to move from 1015 to 1020, the source eNode-B may identify and select an appropriate target carrier on the target eNode-B. For example, eNode-B 1030 may select B1 on eNode-B 1040 based on a measurement report, the carrier load and/or the like. The target eNode-B such as eNode-B 1040 may override the selection decision based on load and/or scheduling metrics of the target eNode-B.

Upon selecting a target carrier, eNode-B 1030 may send a handover request message, such as a CCC Reconfiguration Request message, to eNode-B 1040 to request the preparation of a handover. For example, the handover command may be referred to as CCC-HO command that requests the use of B1 as a "borrowed resource" or CCC. The eNode-B 1040 may check whether the selected target component carrier may be used as a CCC. If eNode-B 1040 may accommodate the UE using the selected CCC, it sends an ACK to the source eNode-B (eNode-B 1030). The target eNode-B (eNode-B 1040) may recommend a new component carrier to the source eNode-B (eNode-B 1030).

UE 102 may be configured to use the new cell B1 by either MAC or RCC signaling.

When the random access procedure with the target eNode-B is successfully completed, the UE may be able to start using B1 as a secondary component carrier. The UE may need to send an "RRC establishing completion" message to the network on completion of synchronization. In one embodiment, if data-splitting is being performed at the S-GW, a message may also be relayed to eNode-B 1040. This may be done to allow creation of the RRC connection in eNode-B 1040.

In one embodiment, data-splitting may be performed in the access stratum at source eNode-B (eNode-B 1030). eNode-B 1030 may initiate data-splitting through the inter-working function (IWF). In another embodiment, data-splitting is performed in the S-GW. In this embodiment, after receiving the "RRC establishing completion" message, eNode-B 1030 or eNode-B 1040 may send a data-splitting request to the S-GW. The S-GW may decide (based on service QCI and delay requirements) to either bi-cast or data-split each incoming GTP tunnel. For example, the S-GW might decide to send the VoIP packets to both source eNode-B (eNode-B 1030) and target eNode-B (eNode-B 1040) and non-VoIP packets to the eNode-B with better signal quality. In addition, eNode-B 1030 may forward the non-VoIP traffic to the target eNode-B 1040.

When UE 102 moves to 1020 and/or when the signal quality of A2 may degrade below the predefined threshold, eNode-B 1030 may sends "full handover request" message to the eNode-B 1040. The target eNode-B 1040 may send ACK to eNode-B 1030 and a PATH_SWITCH message to S-GW. After receiving the full handover ACK message, eNode-B 1030 may send a "full handover indicator" to UE 102. UE 102 may be fully served by eNode-B 1040.

In one embodiment, the above fuzzy cell handover procedure may reduce user-plane interruption time. In the fuzzy cell deployment, due to the overlaying CCs, the UE may have a non-cell edge CC to get its traffic. The cell edges may be staggered such that the eNode-Bs may have a way to route the higher-priority data to the UE. As such, the number of dropped packets due to cell edge degradation may be reduced. In addition, RRC Connection establishment may be moved out of the critical path, thus removing the interruption due to RRC signaling shown in FIG. 8.

In one embodiment, a "UE context" may be established at the "Cooperating eNode-B" such as eNode-B 1040 in FIG. 10. The UE context may enable the other cooperating eNode-Bs in a fuzzy set to operate for data-splitting operation. The UE context may include information required for the eNode-B 1040 to operate the inter-working function, and/or multiplexing/combining of data-flows as required by the specific technique in use. For example, when the data-split decision is performed at the S-GW, or when the data-split decision is performed in the PDCP layer in the source eNode-B, the UE context may include multiple keys, one from each site (eNode-B).

In another embodiment, a RRC connection may be created in the cooperating eNode-B or the target eNode-B, with a standby state. When the eNode-B has the RRC in the standby state, while the regular over the air RRC procedures may be halted, the RRC may still be responsible for configuration of the lower layers. When the trigger for a full handover is triggered, or when a Radio Link Failure condition is detected by the "Master eNode-B", then RRC connection in the cooperating eNode-B may transition to another state such as idle or connected. As the Radio Link Failure condition may be monitored at the Active RRC in the "Master eNode-B", the "Master eNode-B" may send a message to the cooperating eNode-Bs to request one of them to become the "Master eNode-B".

As illustrated in FIG. 10, there may be critical handover locations and/or measurement events that may be used for triggering mobility procedures at 1010, 1015, 1020, and 1025. The following table provides examples of measurement events (Event), which are illustrated with respect to FIG. 3, and further described below:

| | 1010 Position 1 | 1015 Position 2 | 1020 Position 3 | 1025 Position 4 |
|---|---|---|---|---|
| Pcell | A2 | A2 | A2->B1 | B1 |
| Scell | A1 | A1->B1 | B1->A2 | A2->B2 |
| Event | | A6 | A3 | A6 |

Referring now to FIG. 10, at 1010, UE 102 may have an established RRC connection with eNode-B 1030. The CA may be started with 2 CC aggregations. The network configuration may assign UE to associate Pcell on CC A2 and Scell on CC A1. A measuring event may not be triggered as long as UE 102 is moving within the cell boundary of CC A1.

At 1015, intra-frequency Scell handover may occur. Event A5 may be triggered for CC A1 (Pcell) and CC B1 when a measurement of a Pcell, such as CC A1, falls below a threshold and a measurement of a neighbor cell (Ncell) is greater than a threshold. Additionally, event A6 may be triggered for CC B1 and CC A1 (serving) cell when a measurement of a neighbor cell, which may include an offset, is greater than an Scell, such as CC A1.

Detection of a candidate for Pcell may be performed when event A5 occurs as event A5 may indicate that both CC A2 and CC B1 are in extended fuzzy handover zone. In detecting a candidate for Pcell, the network may take note of potential Pcell handover and may make necessary preparations and/or configurations, but may not perform Pcell handover at that time.

For example, the network may start handing over the data flow on A1 to A2 at 1015 (position 2) on detection of a good candidate, such as CC B1. The handing over may complete a position shortly after position 2 on successful indication of the handoff procedure. eNode-B 1030 may use modified RRC reconfiguration procedures to handover CC A1 to CC B2 as described above.

At 1020, inter-frequency Pcell handover may occur. Event A3 may be triggered for CC B1 and CC A1 (Pcell) when a measurement of a neighbor cell, which may include an offset, is greater than a Pcell, such as CC A1.

Event A3 may be used to detect a better candidate for a primary service cell, when, for example, a UE leaves CC A2 and enters CC B1. In one embodiment, which is further described below, for event A3, an offset may be set to zero such that the event would be triggered at midpoint between the two cells to indicate that CC A2 is the same or worse than CC B2. It may be desirable to have the triggering point of event A3 set at the midpoint between eNode-B 1030 and eNode-B 1040 to enable the maximum "fuzzy" handover region to guard against ping-pong effect by ensuring that CC A2 and CC B1 are swapped at that midpoint.

At 1025, intra-frequency Scell handover may occur. Event A6 may be triggered for CC B2 and CC A2 (serving) when a measurement of a neighbor cell, which may include an offset, is greater than a Scell, such as CC A2. In one embodiment, the network may start handing over the data flow on CC A2 to CC B2 at 1025 when a good CC candidate, such as CC B2, is detected.

FIG. 11 depicts example reconfiguration procedures for fuzzy cells. For example, UE 102 that may be connected to a source eNode-B, such as eNode-B 1030, may be handed over to a target eNode-B, such as eNode-B 1040.

At 1160, Source eNode-B 1130 sends a RRC control message to UE 102. UE 102 detects that a trigger event occurs, performs a measurement, and sends a measurement report to source eNode-B 1130.

At 1170, source eNode-B 1130 receives the measurement report from UE 102 and proceeds to determine a carrier for CG HO decision. Source eNode-B 1130 then requests a carrier as CC OH from target eNode-B 1140. Target eNode-B 1140 transmits an acknowledgment (ACK) message to source eNode-B 1130 that may enable source eNode-B 1130 to handover UE 102 to target eNode-B 1140. Source eNode-B 1130 may then send a CCC reconfiguration message to UE 102. In one embodiment, UE 102 may perform DL synchronization and/or timing advance. UE 102 may transmit a CCC reconfiguration complete message to source eNode-b 1130, which may relay a CCC complete message to target eNode-B 1140. After receiving the CCC complete message, target eNode-B 1140 may transmit a CCC ACK message to source eNode-B 1130 and data splitting may be initiated. For example, data may be split between source eNode-B 1130 and target eNode-B 1140.

UE 102 may transmit a measurement report to source eNode-B 1130. When HO condition is satisfied, source eNode-B 1130 may send a HO request to target eNode-B 1140.

At 1180, target eNode-B 1140 may send a path switch request to SGW 1150 and may transmit a HO response to source eNode-B 1130. Source eNode-B 1140 may send a HO command to UE 102. SGW 1150 may send a path switch response to target eNode-B 1140. MME 1145 may send a modify bearer request to SGW 1150 and may receive a modify bearer response. RRC handover may complete using CCC between UE 102 and target eNode-B 1140. Target eNode-B 1140 may then send a UE context release message to source eNode-B 1130.

Figure 12:
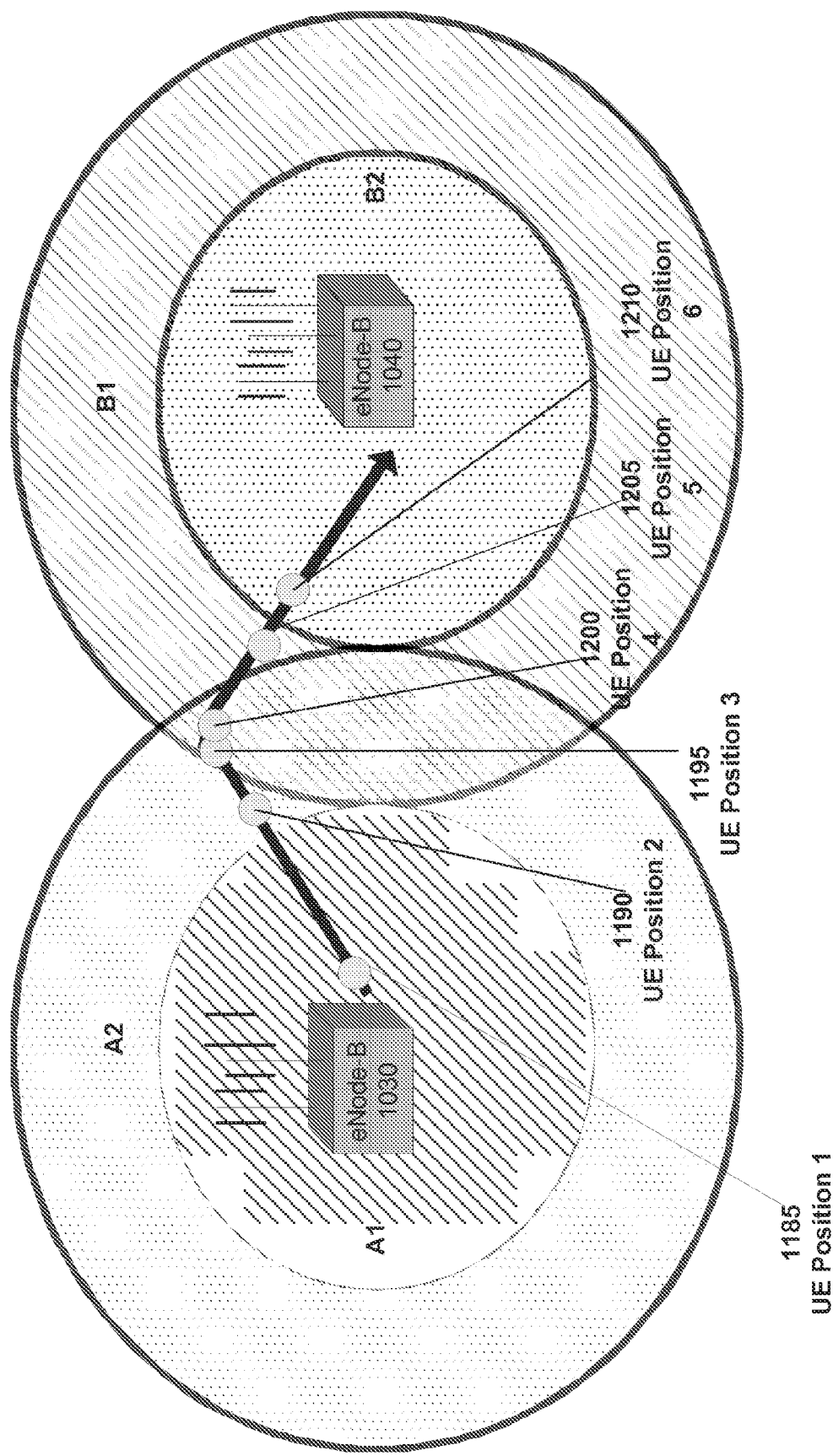
FIG. 12 illustrates another example two base-station fuzzy cell deployment.

FIG. 12 illustrates another example two base-station fuzzy cell deployment. As shown in FIG. 10, eNode-B 1030 and eNode-B 1040 may be deployed with CCs on different frequencies; the slashed area and the dotted area represent the different. FIG. 12 depicts a handover procedure to maintain carrier data flow when a UE traverses a network with Pcell and Scell deployment from eNode-B 1030 to eNode-B 1040 in a triangular path. frequencies. As illustrated in FIG. 12, there may be critical handover location and/or measurement events that may be used for triggering mobility procedures at 1185, 1190, 1195, 1200, 1205, and 1210. The following table provides examples of measurement events (Event), which are illustrated with respect to FIG. 3, and further described below:

| | 1185<br>Position 1 | 1190<br>Position 2 | 1195<br>Position 3 | 1200<br>Position 4 | 1205<br>Position 5 | 1210<br>Position 6 |
|---|---|---|---|---|---|---|
| Pcell | A2 | A2 | A2 | A2 -> B1 | B1 | B1 |
| Scell | A1 | (Deactivated/<br>Deconfigured) | B1 | A2 | (Deactivated/<br>Deconfigured) | B2 |
| Event | | | A4 or A6 | A3/A4 | | A6 |

At 1185, the UE may be moving within the cell boundary of CC A1. When the UE moves within the cell boundary of CC A1, a measurement event may not be triggered.

At 1190, a SCC may be stopped. Event A2 may be triggered when a measurement of a serving cell, such as CC A1, is below a threshold. For example, as a UE, such as UE 102, moves away from the effective CC A1 coverage, the network may stop the data flow on CC A1, which may cause a loss of an active aggregated CC (Scell A1→stops). Several embodiment, which are described below, may provide procedures for stopping the data flow on CC A1. For example, if data-split at S-GW is used, a modified path switch request may be sent to S-GW to stop the data-flow splitting.

At 1195, a SCC may be started. Event A4 may be triggered for CC B1 when a measurement of a neighbor cell is greater than a threshold. Event A5 may be triggered for CC A2 (Pcell) and/or CC B1 when a Pcell, such as CC A2, is lower than a threshold and Ncell is greater than a threshold. Event A4 and/or A5 may be used to provide for the detection of a candidate for Pcell. For example, if A5 is triggered, this may indicate that both CC A2 and CC B1 are in an extended fuzzy handover zone. The network may take note of potential Pcell handover and may make necessary configurations or preparations, but may not perform Pcell handover at that time. In one example embodiment, network may start data-splitting the data flow on to CC B1 at 1195 on detection of a good candidate for Scell, such as CC B1.

At 1200, inter-frequency Pcell handover may occur. Event A3 may be triggered for CC B1 and CC A1 (Pcell) when a measurement of a neighbor cell, which may include an offset, is greater than a Pcell, such as CC A1. Event A3 may be used to provide for the detection of a better candidate for Pcell (Pcell A2→B1).

In one embodiment, which is further described below, for event A3, an offset may be set to zero such that the event would trigger at this position (1200) to indicate that CC A2 is the same or worse than CC B1. It may then be desirable to hand off PCC to CC B1. Additionally, it may be desirable to have the triggering point of event A2 to be set soon after the midpoint between eNode-B 1030 and eNode-B 1040 to enable maximum fuzzy handover region in order to guard against pint-pong effect by ensuring that CC A2 and CC B1 are swapped at that midpoint.

At 1205, Scell A2 may be stopped. Event A2 may be triggered for CC A2 when a serving CC, such as CC A2, is less than a threshold. Event A2 may be used to detect quality degradation on CC A2 in order to stop the data flow on CC A2 at 1205. For example, if data-split at S-GW is used, a modified path switch request may be sent to S-GW to stop data-flow splitting.

In one example embodiment, CC A2 deactivation may occur. For example, a fast deactivation message may be sent to the UE. Data flow may then stop on CC A1 when deactivation completes. CC A2 may remain as an inactive CA candidate. In another example embodiment, CC A2 may be released. A RCC reconfiguration message may be sent to the UE. CC A2 may be released and may be removed from the CA set when a RRC reconfiguration message is received from the UE.

At 1210, Scell B2 may be started. Event A4 may be triggered for CC B2 when a measurement for a neighbor cell may be greater than a threshold. Event A4 may be used to detect a good Scell candidate, such as a CC B2, and start data-splitting the data flow on to CC B2. In one example embodiment, fast activation for CC B2 may be used. For example, if CC B2 is an inactive member of CA candidate set, CC B2 may be activated using fast activation procedure. The fast activation procedure may assume RRC reconfiguration has configured CC B2 prior to the UE reaching position 2 (1190). In another example embodiment, CC B2 aggregation may occur. For example, eNode-B 1040 may send a RCC reconfiguration request to the UE to add CC B2 to the aggregated bandwidth.

In one embodiment, the above fuzzy cell handover procedure may reduce user-plane interruption time. In the fuzzy cell deployment, due to the overlaying CCs, the UE may have a non-cell edge CC to get its traffic. The cell edges may be staggered such that the eNode-Bs may have a way to route the higher-priority data to the UE. As such, the number dropped packets due to cell edge degradation may be reduced. In addition, RRC Connection establishment may be moved out of the critical path, thus removing the interruption due to RRC signaling shown in FIG. 8.

In one embodiment, a "UE context" may be established at the "Cooperating eNode-B" such as eNode-B 1040 in FIG. 12. The UE context may enable the other cooperating eNode-Bs in a fuzzy set to operate for data-splitting operation. The UE context may include information required for the eNode-B 1040 to operate the inter-working function, and/or multiplexing/combining of data-flows as required by the specific technique in use. For example, when the data-split decision is performed at the S-GW, or when the data-split decision is performed in the PDCP layer in the source eNode-B, the UE context may include multiple keys, one from each site (eNode-B).

In another embodiment, a RRC connection may be created in the cooperating eNode-B or the target eNode-B, with a standby state. When the eNode-B has the RRC in the standby state, while the regular over the air RRC procedures may be halted, the RRC may still be responsible for configuration of the lower layers. When the trigger for a full handover is triggered, or when a Radio Link Failure condition is detected by the "Master eNode-B", then RRC connection in the cooperating eNode-B may transition to another state such as idle or connected. As the Radio Link Failure condition may be monitored at the Active RRC in the "Master eNode-B", the "Master eNode-B" may send a message to the cooperating eNode-Bs to request one of them to become the "Master eNode-B".

Figure 13:
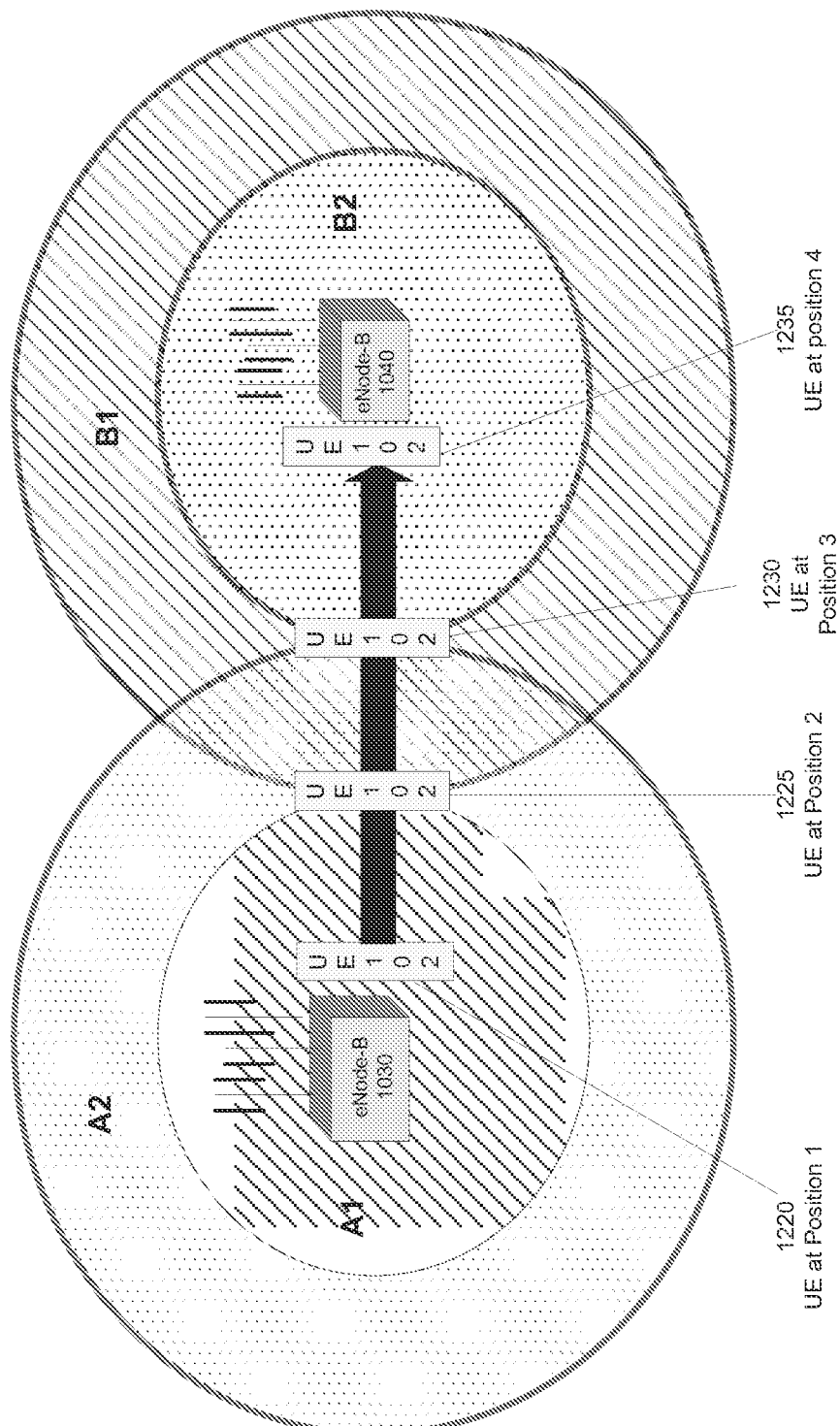
FIG. 13 illustrates another example two base-station fuzzy cell deployment.

FIG. 13 illustrates another example two base-station fuzzy cell deployment. As shown in FIG. 13, eNode-B 1030 and eNode-B 1040 may be deployed with CCs on different frequencies; the slashed area and the dotted area represent the different frequencies. UE 102 may be connected to a source eNode-B, such as eNode-B 1030, may be handed over to a target eNode-B, such as eNode-B 1040. This embodiment may be used to trigger data-splitting operations when a UE moves in a straight line from eNode-B 1030 to eNode-B 1040. eNode-B 1040 and/or eNode-B 1040 may be eNode-B 104 shown with respect to FIG. 1C.

In one example embodiment, it may be preferable to use a Fast activation/deactivation procedure to, for example, deactivate Scell A1, which may be configured on a first frequency, and activate Scell B1, which may also be configured on the first frequency.

As illustrated in FIG. 13, there may be critical handover locations and/or measurement events that may be used for triggering mobility procedures at 1220, 1225, 1230, and 1235. The following table provides examples of measurement events (Event), which are illustrated with respect to FIG. 3, and further described below:

|  | 1220 Position 1 | 1225 Position 2 | 1230 Position 3 | 1235 Position 4 |
|---|---|---|---|---|
| Pcell | A2 | A2 | A2->B1 | B1 |
| Scell | A1 | A1->B1 | B1->A2 | A2->B2 |
| Procedure |  | Act/Deactivation | A3 | Act/Deactivation |

As shown in FIG. 13, at 1220 UE 102 may have an established RRC connection with eNode-B 1030. The CA may be started with 2 CC aggregations. The network configuration may assign UE to associate Pcell on CC A2 and Scell on CC A1. A measuring event may not be triggered as long as UE 102 is moving within the cell boundary of CC A1.

At 1225, intra-frequency Scell handover may occur. Event A5 may be triggered for CC A1 (Pcell) and CC B1 when a measurement of a Pcell, such as CC A1, falls below a threshold and a measurement of Ncell is greater than a threshold. Additionally, event A6 may be triggered for CC B1 and CC A1 (serving) when a measurement of a neighbor cell, which may include an offset, is greater than an Scell, such as CC A1. For example, the network may start handing over the data flow on A1 to A2 at 1015 (position 2) on detection of a good candidate, such as CC B1.

Detection of a candidate for Pcell may be performed when event A5 occurs as event A5 may indicate that both CC A2 and CC B1 are in extended fuzzy handover zone. In detecting a candidate for Pcell, the network may take note of potential Pcell handover and may make necessary preparations and/or configurations.

At 1225, MAC fast activation and deactivation may be used to deactivate Scell A1 and activate Scell B1. This may be done, for example, to reduce RRC signaling due to frequent Scell handovers, which may offset some of the gains achieved by fuzzy cell deployment.

In one example embodiment, the UE may be preconfigured with multiple Scells on a secondary frequency, and a new physical layer/MAC-level trigger. This may be done to enable deactivation of Scell A1 and activation of Scell B1, shown with respect to FIG. 3. The serving eNode-B may simultaneously perform signaling with the cooperating eNode-B to initiate data-splitting, Referring again to FIG. 13, in an example embodiment, the trigger to perform activation/deactivation and initiate data-splitting may require a new measurement. This may be accomplished by configuring the UE to report multiple CQIs, one for each configured Scell with associated cell-id. The network may correlate the CQI received from the UE to perform activation/deactivation based on the channel conditions. The UE may also measure more than one CQI in each frequency such that the activation/deactivation procedure may handle a change in physical cell-id.

In another example embodiment, Scellx and Scelly, shown with respect to FIG. 3, may share the same cell-id (Scellx=Scelly=Scell). For example, referring again to FIG. 13, Scell A1 and Scell B1 may share the same cell-id. As shown in FIG. 13, the trigger may be based on a differential seen in the channel estimation (using DM-RS) as the UE move to 1225. The L1 reporting may be extended to additionally report this new metric and the network may heuristically use this to detect a transition from Scellx to Scelly. For example, the L1 reporting may be used by the network to detect a transition from Scell A1 to Scell B1.

At 1230, inter-frequency Pcell handover may occur. Event A3 may be triggered for CC B1 and CC A1 (Pcell) when a measurement of a neighbor cell, which may include an offset, is greater than a Pcell, such as CC A1.

Event A3 may be used to detect a better candidate for a primary service cell, when, for example, a UE leaves CC A2 and enters CC B1. In one embodiment, which is further described below, for event A3, an offset may be set to zero such that the event would be triggered at midpoint between the two cells to indicate that CC A2 is the same or worse than CC B2. It may be desirable to have the triggering point of event A3 set at the midpoint between eNode-B 1030 and eNode-B 1040 to enable the maximum "fuzzy" handover region to guard against ping-pong effect by ensuring that CC A2 and CC B1 are swapped at that midpoint.

At 1235, intra-frequency Scell handover may occur. Event A6 may be triggered for CC B2 and CC A2 (serving) when a measurement of a neighbor cell, which may include an offset, is greater than a Scell, such as CC A2. In one embodiment, the network may start handing over the data flow on CC A2 to CC B2 at 1235 when a good CC candidate, such as CC B2, is detected.

At 1235, MAC fast activation and deactivation may be used to deactivate Scell A2 and activate Scell B2. This may be done, for example, to reduce RRC signaling due to frequent Scell handovers, which may offset some of the gains achieved by fuzzy cell deployment.

In one example embodiment, the UE may be preconfigured with multiple Scells on a secondary frequency, and a new physical layer/MAC-level trigger. This may be done to enable deactivation of Scell A2 and activation of Scell B2. The serving eNode-B may simultaneously perform signaling with the cooperating eNode-B to initiate data-splitting, In an example embodiment, the trigger to perform activation/deactivation and initiate data-splitting may require only a new measurement. This may be accomplished by configuring the UE to report multiple CQIs, one for each configured Scell with associated cell-id. The network may correlate the CQI received from the UE to perform activation/deactivation based on the channel conditions. The UE may also measure more than one CQI in each frequency such that the activation/deactivation procedure may handle a change in physical cell-id.

In another example embodiment, Scellx and Scelly, shown with respect to FIG. 3, may share the same cell-id (Scellx=Scelly=Scell). For example, referring again to FIG. 13, Scell A2 and Scell B2 may share the same cell-id. As shown in FIG. 13, in this embodiment, the trigger may be based on a differential seen in the channel estimation (using DM-RS) as the UE move to 1235. The L1 reporting may be extended to additionally report this new metric and the network may heuristically use this to detect a transition from Scellx to Scelly. For example, the L1 reporting may be used by the network to detect a transition from Scell A2 to Scell B2.

In one embodiment, the above fuzzy cell handover procedure may reduce user-plane interruption time. In the fuzzy cell deployment, due to the overlaying CCs, the UE may have a non-cell edge CC to get its traffic. The cell edges may be staggered such that the eNode-Bs may have a way to route the higher-priority data to the UE. As such, the number dropped packets due to cell edge degradation may be reduced. In addition, RRC Connection establishment may be moved out of the critical path, thus removing the interruption due to RRC signaling shown in FIG. 8.

In one embodiment, a "UE context" may be established at the "Cooperating eNode-B" such as eNode-B 1040 in FIG. 13. The UE context may enable the other cooperating eNode-Bs in a fuzzy set to operate for data-splitting operation. The UE context may include information required for the eNode-B 1040 to operate the inter-working function, and/or multiplexing/combining of data-flows as required by the specific technique in use. For example, when the data-split decision is performed at the S-GW, or when the data-split decision is performed in the PDCP layer in the source eNode-B, the UE context may include multiple keys, one from each site (eNode-B).

In another embodiment, a RRC connection may be created in the cooperating eNode-B or the target eNode-B, with a standby state. When the eNode-B has the RRC in the standby state, while the regular over the air RRC procedures may be halted, the RRC may still be responsible for configuration of the lower layers. When the trigger for a full handover is triggered, or when a Radio Link Failure condition is detected by the "Master eNode-B", then RRC connection in the cooperating eNode-B may transition to another state such as idle or connected. As the Radio Link Failure condition may be monitored at the Active RRC in the "Master eNode-B", the "Master eNode-B" may send a message to the cooperating eNode-Bs to request one of them to become the "Master eNode-B".

Figure 14:
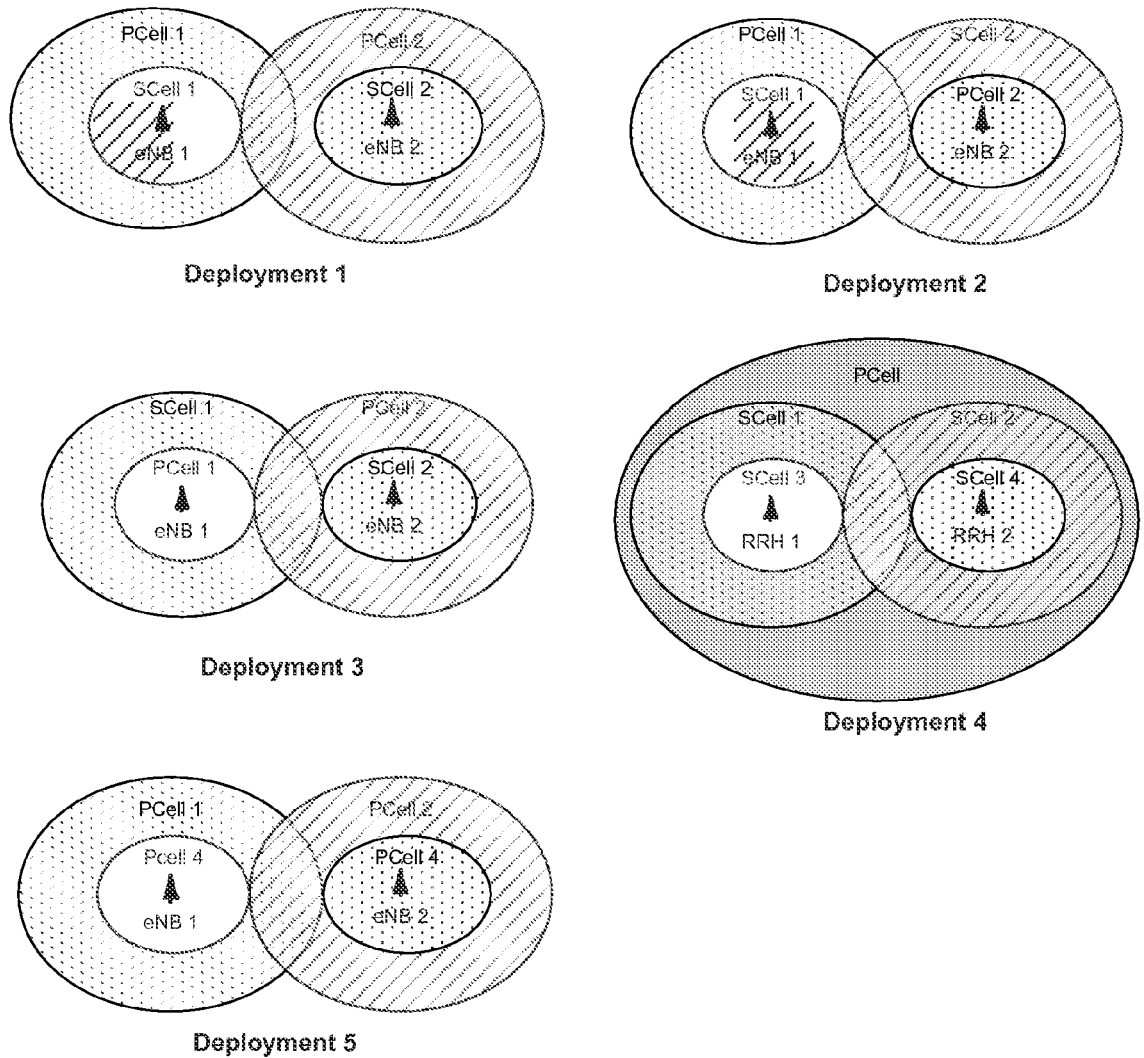
FIG. 14 illustrates example fuzzy cell deployments.

FIG. 14 illustrates example fuzzy cell deployments. As shown in FIG. 14, there are numerous deployment options that may be used to achieve the gains of fuzzy cell deployment. The methods described herein may be used individually or in combination with each other to enable mobility handling in each of the deployments depicted in FIG. 14.

Figure 15:
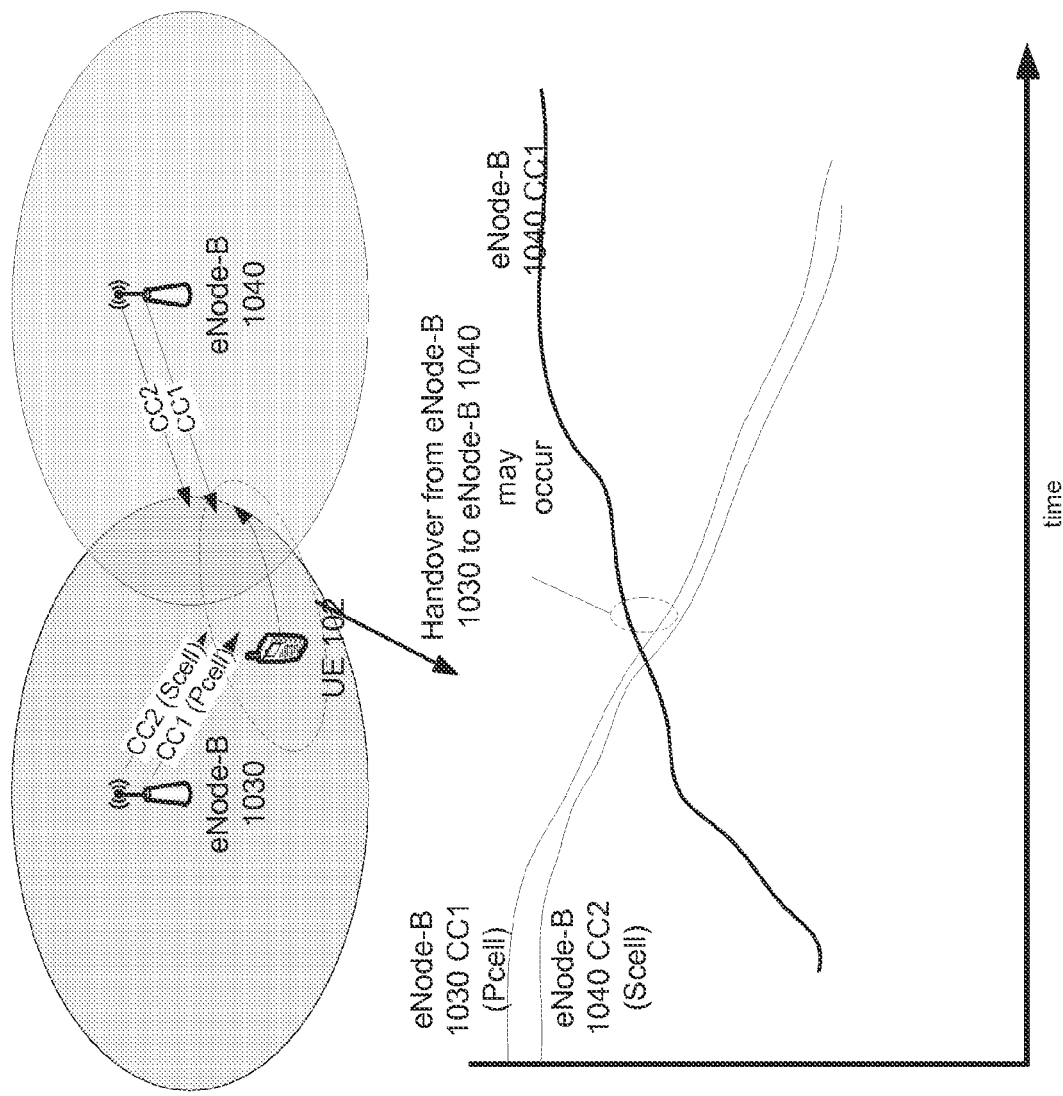
FIG. 15 illustrates an example method for handover triggering with fuzzy cell development.

FIG. 15 illustrates an example method for handover triggering with fuzzy cell development. In order to support handover in LTE-A with carrier aggregation, per carrier UE measurement and reporting over aggregated downlink carriers may need to be defined, including carrier-specific RSRP and/or RSRQ. Current mechanisms do not support intra-frequency measurements because measurements are based on serving cells. For example, an eNodeB owns 3 carriers F1/F2/F3. UE is using F1 and F2 and F1 is the serving cell. When the signal quality of F3 is better than F2, there is no measurement scheme to cover it and the UE cannot report this situation. The current mechanisms need to be enhanced to support carrier-specific measurements including from non-serving cells.

Currently mechanisms specify the new measurement cycle for measurements on deactivated secondary Scells, which may have a different range of values as compared to Pcells. However, the measurements of the Scell are occurring less frequently, the Scell measurements as observed by the UE can significantly lag the true radio conditions, especially when compared to the Pcell. UE includes in measurement reports L3 filtered measurements of the Scell. This can lead to the Scell being reported as better than the Pcell, which can result in a Pcell change procedure.

FIG. 14 illustrates L3 HO triggering misdetection that may occur due to different reporting cycles. In one example embodiment, L3 HO triggering misdetection may be prevented by aligning the measurement cycles for the activated and deactivated cells so that the minimum delta is the view of the radio conditions between the configured carriers. In another example embodiment, L3 HO triggering misdetection may be prevented by employing carrier specific TTT values to create larger hysteresis for deactivated Scells measurement reports.

The measurement event A3 may be configured by the network to set the desired handover condition. In one example embodiment, the measurement event A3 may be configured to improve signaling receive quality. For example, event A3 offset value may be set closer to or at 0 may cause UE to signal event A3 as soon as a stronger neighbor cell than Pcell is detected. This setting may enhance the fuzzy cell deployment benefit of better connectivity by ensuring the UE may be associated with a none-cell edge CC for control signaling on Pcell. This may reduce the likelihood of call failures.

In another example embodiment, the measurement event A3 may be configured to minimize HO occurrence. For example, event A3 offset value may be set to a higher value will delay the handover trigger till UE gets closer to the cell-edge of current Pcell. This setting may enhance the fuzzy cell deployment benefit of extending handover tolerance zone as shown in FIG. 16.

FIGS. 16A-B illustrate down link fuzzy cell coverage. As shown in FIGS. 16A-B, T is the handover tolerance zone that may include the hysteresis region for HO triggering. As illustrated by FIG. 16B, fuzzy cell deployment may create a wider T and the value of increased range H is proportional to the offset value.

Referring again to FIG. 15, the network can may the UE service class (QCI) to adjust the HO event trigger offset to balance between improving signaling receive quality and minimizing HO occurrence in order to optimize user satisfaction. For example, if the UE requested service is voice call, the acceptable RLC error rate at $10^{-2}$ is much lower than streaming video at $10^{-5}$. Therefore, the network may set the configure event A3/A6 with a smaller offset (optimize signal reception quality) such that UE with voice call service may perform HO at a higher than SINR than UE with streaming voice call. This may allow both users to get benefit of HO signaling improvement with fuzzy cell and also lowers service disruption with minimal HO occurrence without affecting user satisfaction.

Figure 17:
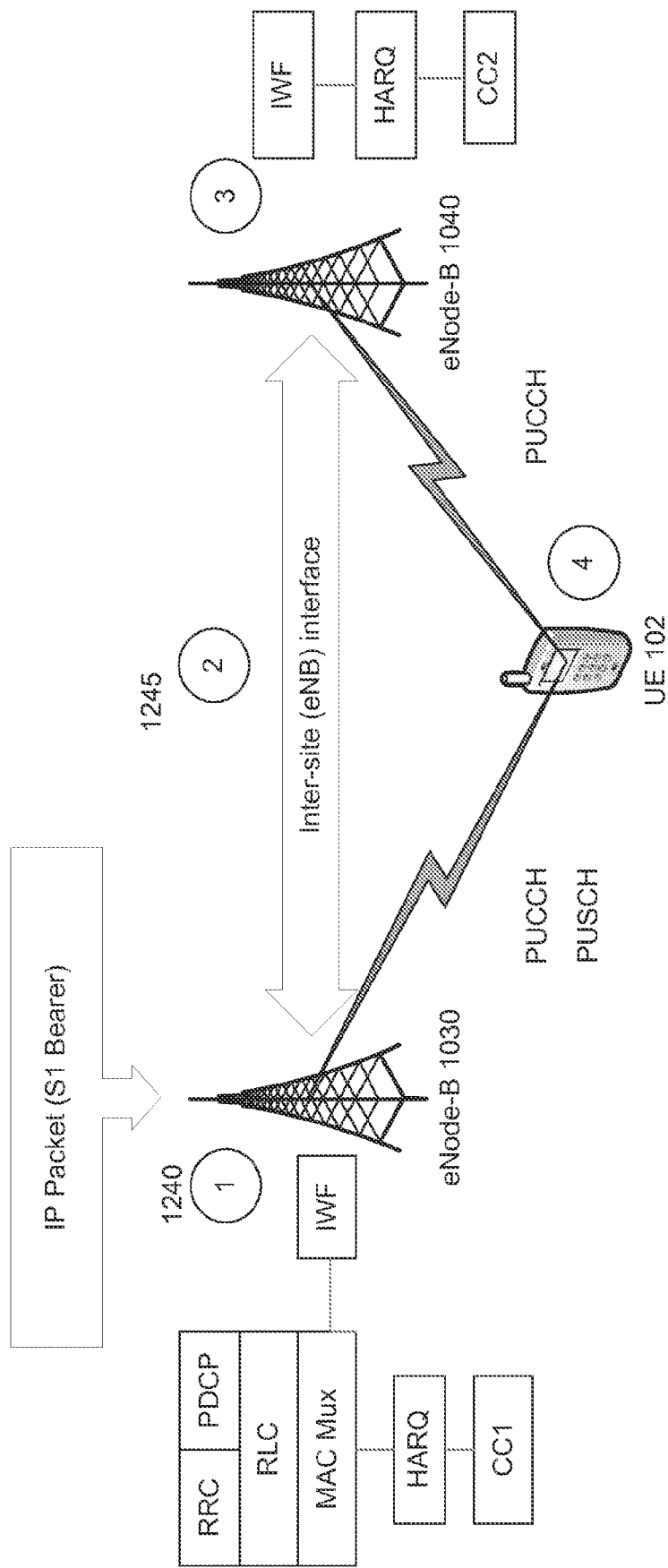
FIG. 17 illustrates example asymmetric uplink channel allocation.

FIG. 17 illustrates an example asymmetric uplink channel allocation. As shown in FIG. 17, one of the possible deployment possibilities is that there is a single uplink shared channel for multiple downlink carriers. In case of MAC-AS data-splitting option, the UE may send and may receive HARQ acknowledgements to/from the corresponding base-stations. In case of data-splitting at the S-GW, the UE needs to provide feedback for MAC (HARQ acknowledgements) and RLC (RLC Acknowledged modes) to each eNode-Bs from which is receives downlink traffic. The UE may maintain separate buffers and processing at MAC, RLC and PDCP for each eNode-B. Feedback messages may be sent back to the "Master eNode-B" that may create and may forward RLC acknowledgement reports to some or all the other eNode-Bs in the "cooperating eNode-Bs".

In one embodiment, per carrier UE measurement and reporting over aggregated downlink carriers may be modified to support handover in LTE-A with carrier aggregation. For example, carrier-specific RSRP and/or RSRQ may be included. Intra-frequency measurements may be provided, and carrier-specific measurements including from non-serving cells may be supported. For example, an eNode-B may own three carriers F1, F2, and F3. UE may use F1 and F2, and F1 may be the serving cell. When the signal quality of F3 is better than F2, a measurement scheme may be provided to report that F3 is more desirable than F2.

A handover procedure may trigger the target eNode-B and the UE to generate fresh keys for ciphering and encryption algorithm, derived from $\{K_{eNode-B}^{*}, NCC\}$ pair sent from the source eNode-B. The target eNode-B 1040 may use this tuple to generate a fresh $K_{eNode-B}$. The $K_{UPenc}$ key may be used (derived from $K_{eNode-B}$) for protection of User-Plane traffic with a particular encryption algorithm. In the case that UE maintains RRC Connection with eNode-B 1030 as it moves from Position 1 (1240) to Position 2 (1245), the PDCP entity running in target eNode-B such as eNode-B 1040 may continue using the same keys as source eNode-B (eNode-B 1030). This may allow the UE to receive PDCP entities from different eNode-Bs simultaneously. The keys may be exchanged with the Handover Command in the handover preparation phase from the source to target eNode-B. The information may also be conveyed during the Initial Context Setup from the S-GW.

Figure 18:
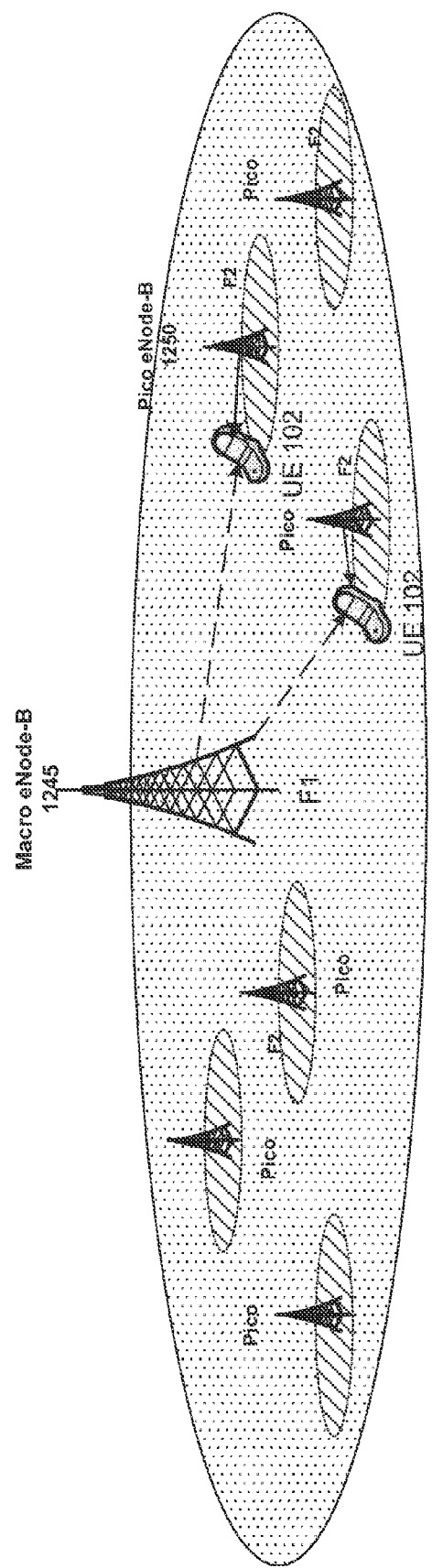
FIG. 18 illustrates fuzzy cell concept in heterogeneous networks.

FIG. 18 illustrates fuzzy cell concept in heterogeneous networks. In an example embodiment, a fuzzy cell may be established between one or more pico cells and a macro cell. For example, in a heterogeneous deployment, it may be possible to create fuzzy cell configuration for a UE, such as UE 102, by receiving one carrier from the macro enode-B, such as macro enode-B 1245, and another carrier from a pico enode-B, such as pico enode-B 1250. In one example embodiment, pico eNode-B 1250 and pico eNode-B 1245 may be deployed with CCs on two frequencies, which are represented by the slashed area and the dotted area. For example. Macro eNode-B 1245 and/or pico eNode-B 1250 may be eNode-B 140 shown with respect to FIG. 1C.

Figure 19:
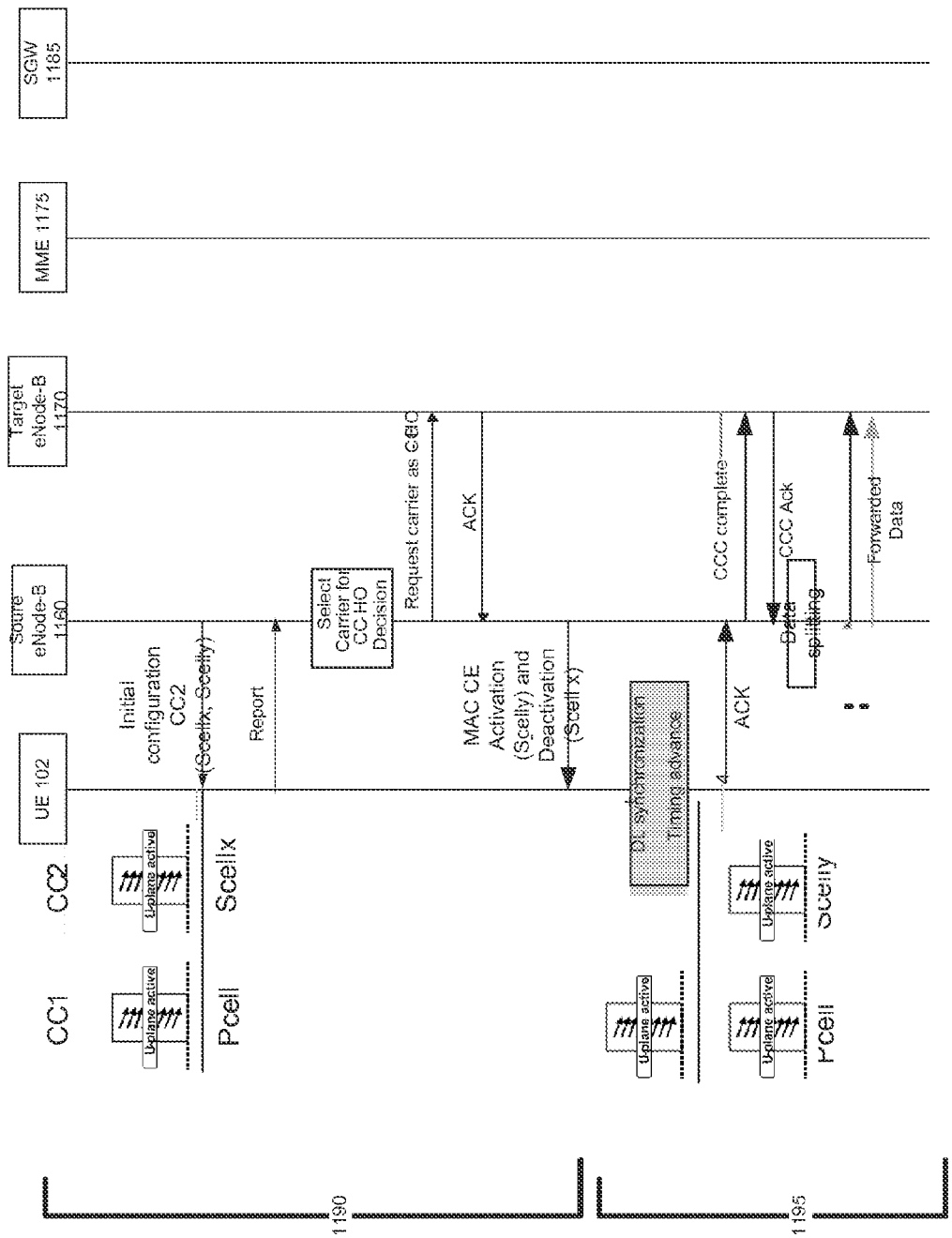
FIG. 19 illustrates an example embodiment for fast activation/deactivation for fuzzy cells.

FIG. 19 illustrates an example embodiment for fast activation/deactivation for fuzzy cells. For example, UE 102 that may be connected to a source eNode-B, such as source eNode-B 1160, may be handed over to a target eNode-B, such as eNode-B 1170.

At 1190, source e-node-B 1160 may transmit an initial configuration for CC2 to UE 102. The initial configuration for CC2 may include information regarding one or more Scells, such as Scellx and Scelly. Ue 102 may detect that a trigger event occurred, may perform a measurement, and may send a measurement report to source eNode-B 1160. Source eNode-B 1160 receives the measurement report from UE 102 and proceeds to determine a carrier for CG HO decision. Source eNode-B 1160 then requests a carrier as CC OH from target eNode-B 1170. Target eNode-B 1170 may transmit an acknowledgment (ACK) message to source eNode-B 1160 that may enable source eNode-B 1160 to handover UE 102 to target eNode-B 1170. Source eNode-B 1160 may then send a handover request message, such as a MAC CE activation/deactivation message, to UE 102. The handover request message may be a MAC CE activation/deactivation message. The handover request message may instruct and/or enable UE 102 to perform fast MAC activation on a first Scell, such as Scelly, and to perform a fast MAC deactivation on a second Scell, such as Scellx.

At 1195, UE 102 may perform fast MAC activation on a first Scell, such as Scelly, and perform a fast MAC deactivation on a second Scell, such as Scellx. UE 102 may perform DL synchronization and/or timing advance. UE 102 may transmit an acknowledgment message to source eNode-B 1160. Source eNode-B 1160 may transmit a CCC complete message to Target eNode-B 1170. Target eNode-B 1170 may transmit a CCC acknowledgement message to source eNode-B 1160. Upon receiving receiving the CCC acknowledgement message, data splitting may occur as described above. For example, data splitting may occur as illustrated in FIG. 5, FIG. 6, or FIG. 7. Data may then be forwarded from source eNode-B 1160 to target eNode-B 1170.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method for providing dual connectivity for wireless transmit/receive unit (WTRU), the method comprising:
   receiving, via a source eNode-B, a measurement report from the WTRU;
   sending a reconfiguration message to the WTRU to instruct the WTRU to use a second component carrier associated with a target eNode-B such that the WTRU can receive data split between the source e-Node-B and the target eNode-B; and
   sending a component carrier cooperation (CCC) handover command to a target eNode-B such that a first connection between the source eNode-B and the WTRU using a first component carrier can be maintained while a second connection between the WTRU and the target eNode-B using the second component carrier can be established.

2. The method of claim 1, wherein the sending the reconfiguration message to the WTRU comprising sending the reconfiguration message to the WTRU via medium access control (MAC) or radio resource control (RRC) signaling.

3. The method of claim 1, further comprising identifying the second component carrier associated with the target eNode-B.

4. The method of claim 3, wherein identifying the second component carrier comprises:
   analyzing the measurement report received from the WTRU; and
   identifying the second component carrier based on the analysis of the measurement report.

5. The method of claim 1, wherein the measurement report comprises a first signal quality of the first component carrier and a second signal quality of the second component carrier.

6. The method of claim 1, wherein the measurement report comprises a channel quality indication (CQI) for each secondary serving cell (Scell) associated with a cell identification.

7. The method of claim 1, wherein the measurement report identifies a differential seen in a channel estimation between one or more Scells associated with a cell identification.

8. The method of claim 1, wherein the measurement report includes carrier specific time to trigger values.

9. The method of claim 1, wherein the CCC handover command instructs the target eNode-B to establish the second connection to the WTRU using the second component carrier.

10. The method of claim 1, further comprising receiving a recommendation message from the target eNode-B identifying the second component carrier.

11. The method of claim 1, further comprising receiving an acknowledgment message from the target eNode-B.

12. A method for providing dual connectivity for a wireless transmit/receive unit (WTRU), the method comprising:
    sending, via a WTRU, a measurement report to a source eNode-B;
    receiving a reconfiguration message from the source eNode-B instructing the WTRU to use a second component carrier associated with a target eNode-B such that the WTRU can receive data split between the source eNode-B and the target eNode-B; receiving a handover request message from the source eNode-B; and
    establishing, while maintaining a first connection to the source eNode-B using a first component carrier, a second connection to the target eNode-B with the second component carrier.

13. The method of claim 12, wherein receiving the reconfiguration message from the source eNode-B further comprises receiving the handover request message via medium access control (MAC) or radio resource control (RRC) signaling.

14. The method of claim 12, wherein the measurement report comprises a channel quality indication (CQI) for each secondary serving cell (Scell) associated with a cell identification.

15. The method of claim 12, wherein the measurement report identifies a differential seen in a channel estimation between one or more Scells associated with a cell identification.

16. The method of claim 12, wherein the measurement report includes carrier specific time to trigger values.

17. A method for providing dual connectivity for a wireless transmit/receive unit (WTRU), the method comprising:
    receiving, via a target eNode-B, a component carrier cooperation (CCC) handover command from a source eNode-B, the CCC handover command identifying a component carrier;
    sending an acknowledgement message that indicates that the component carrier can be used to split data between the source eNode-B and the target eNode-B; and
    establishing a connection between the WTRU and the target eNode-B using the component carrier based on the CCC handover command such that a connection between the WTRU and the source eNode-B is maintained.

18. The method of claim 17, wherein the acknowledgement indicates that WTRU is permitted to use the component carrier.

19. The method of claim 17, wherein establishing the connection between the WTRU and the target eNode-B using the component carrier comprises allowing the WTRU to use the component carrier via medium access control (MAC) or radio resource control (RRC) signaling.

20. The method of claim 17, wherein the CCC handover command instructs the target eNode-B to establish the connection between the WTRU and the target eNode-B using the component carrier.

21. The method of claim 17, further comprising transmitting a recommendation message identifying a second component carrier associated with the target eNode-B.

22. An eNode-B for providing dual connectivity for a wireless transmit/receive unit (WTRU), the eNode-B comprising:
a processor, the processor being configured to:
receive a measurement report from the WTRU;
send a reconfiguration message to the WTRU to instruct the WTRU to use a second component carrier associated with a target eNode-B such that the WTRU can receive data split between the eNode-B and the target eNode-B; and
send a component carrier cooperation (CCC) handover command to the target eNode-B such that a first connection between the eNode-B and the WTRU using a first component carrier can be maintained while a second connection between the WTRU and the target eNode-B using the second company carrier can be established.

23. The eNode-B of claim 22, wherein the processor is configured to send the reconfiguration message to the WTRU by sending the reconfiguration message via medium access control (MAC) or radio resource control (RRC) signaling.

24. The eNode-B of claim 22, wherein the processor is further configured to identify the second component carrier associated with the target eNode-B.

25. The eNode-B of claim 22, wherein the measurement report comprises a first signal quality of the first component carrier and a second signal quality of the second component carrier.

26. The eNode-B of claim 22, wherein the CCC handover command instructs the target eNode-B to establish the second connection to the WTRU using the second component carrier.

27. A wireless transmit/receive unit (WTRU) for providing dual connectivity, the WTRU comprising:
a processor, the processor configured to:
send a measurement report to a source eNode-B;
receive a reconfiguration message from the source eNode-B instructing the WTRU to use a second component carrier associated with a target eNode-B such that the WTRU can receive data split between the source eNode-B and the target eNode-B;
receive a handover request message from the source eNode-B; and
establish, while maintaining a first connection the source eNode-B using a first component carrier, a second connection to the target eNode-B with the second component carrier.

28. The WTRU of claim 27, wherein the measurement report comprises a channel quality indication (CQI) for a secondary serving cell (Scell) associated with a cell identification.

29. The WTRU of claim 27, wherein the measurement report identifies a differential seen in a channel estimation between one or more Scells associated with a cell identification.

30. The WTRU of claim 27, wherein the measurement report includes a carrier time to trigger value.

* * * * *